(12) United States Patent
Wang

(10) Patent No.: US 12,486,861 B2
(45) Date of Patent: Dec. 2, 2025

(54) FASTENER STRUCTURE

(71) Applicant: FIVETECH TECHNOLOGY INC., New Taipei (TW)

(72) Inventor: Ting-Jui Wang, New Taipei (TW)

(73) Assignee: FIVETECH TECHNOLOGY INC., New Taipei (TW)

( * ) Notice: Subject to any disclaimer, the term of this patent is extended or adjusted under 35 U.S.C. 154(b) by 364 days.

(21) Appl. No.: 16/894,910

(22) Filed: Jun. 8, 2020

(65) Prior Publication Data
US 2021/0025416 A1 Jan. 28, 2021

(30) Foreign Application Priority Data

Jul. 22, 2019 (TW) .................................. 108209559
Oct. 15, 2019 (TW) .................................. 108213593

(51) Int. Cl.
*F16B 5/02* (2006.01)
*F16B 2/20* (2006.01)
*F16B 5/06* (2006.01)
*F16B 35/04* (2006.01)

(52) U.S. Cl.
CPC .............. *F16B 2/205* (2013.01); *F16B 5/06* (2013.01); *F16B 35/04* (2013.01)

(58) Field of Classification Search
CPC .. F16B 2/205; F16B 2/20; F16B 2/243; F16B 2/246; F16B 2/245; F16B 2/26; F16B 5/0266; F16B 35/04; F16B 5/06
USPC ........................................................ 24/530
See application file for complete search history.

(56) References Cited

U.S. PATENT DOCUMENTS

| | | | | |
|---|---|---|---|---|
| 573,891 A * | 12/1896 | Martin | ................... | A47L 13/512 248/113 |
| 2,044,656 A * | 6/1936 | Wright | ...................... | B67B 7/18 294/28 |
| 3,559,515 A * | 2/1971 | Kyser | ...................... | B25B 7/08 81/416 |
| 4,071,930 A * | 2/1978 | Tanaka | ................... | D06F 55/00 24/543 |
| 4,602,406 A * | 7/1986 | Gelula | ...................... | F16B 1/00 24/631 |
| 5,446,948 A * | 9/1995 | Genero | ..................... | B25B 5/12 24/337 |
| 5,619,777 A * | 4/1997 | Genero | ..................... | B25B 5/06 24/337 |
| 5,678,284 A * | 10/1997 | Genero | ..................... | B25B 5/06 24/337 |
| 5,713,112 A * | 2/1998 | Genero | ................. | E05C 19/024 269/238 |
| 6,842,951 B1 * | 1/2005 | Barre | ....................... | B25B 7/02 24/515 |
| 8,181,317 B2 * | 5/2012 | Kim | ......................... | F16B 2/22 24/562 |

(Continued)

FOREIGN PATENT DOCUMENTS

TW 200518594 A 6/2005

*Primary Examiner* — Nkeisha Smith

(57) ABSTRACT

A fastener structure includes a fastening element and a body portion. The fastening element includes an operation portion and a fastening portion. The body portion is coupled to the fastening element by a coupling portion. The body portion is fastened to a first object and is fastened to or unfastened from a second object by the fastening element to couple together and separate the first and second objects repeatedly and rapidly.

19 Claims, 28 Drawing Sheets

(56) References Cited

U.S. PATENT DOCUMENTS

| | | | |
|---|---|---|---|
| 10,363,985 B2* | 7/2019 | Muller | B62J 11/00 |
| 11,280,360 B2* | 3/2022 | Williams | F16B 2/245 |
| 2012/0076467 A1* | 3/2012 | Khadar | G02B 6/4477 |
| | | | 24/132 R |
| 2022/0170490 A1* | 6/2022 | Roth | B60J 10/30 |

* cited by examiner (a)                    (b)

(a)

(b)

FASTENER STRUCTURE

CROSS-REFERENCE TO RELATED APPLICATION

This non-provisional application claims priority under 35 U.S.C. § 119(a) on Patent Application No(s). 108209559 filed in Taiwan, R.O.C. on Jul. 22, 2019 and Patent Application No(s). 108213593 filed in Taiwan, R.O.C. on Oct. 15, 2019, the entire contents of which are hereby incorporated by reference.

BACKGROUND OF THE INVENTION

1. Field of the Invention

The present disclosure relates to fastener structures, and in particular to a fastener structure capable of allowing at least two objects to be coupled together and separated repeatedly and rapidly.

2. Description of the Related Art

Conventionally, coupling together at least two objects (or three objects) requires fastening them together with screws.

Although the aforesaid prior art is effective in coupling together at least two objects to render them inseparable, the aforesaid prior art not only fails to render the coupling process easy but its use of screws also renders at least one object difficult to demount.

BRIEF SUMMARY OF THE INVENTION

At least one embodiment of the present disclosure provides a fastener structure which comprises a body portion for holding a first object and a fastening element for being fastened to or unfastened from a second object, thereby allowing the first and second objects to be coupled together and separated repeatedly and rapidly.

The present disclosure provides a fastener structure comprising a fastening element and a body portion. The fastening element comprises an operation portion and a fastening portion. The body portion and the fastening element are coupled together by a coupling portion. The body portion is coupled to the first object. The fastening element is fastened to the second object.

Therefore, the body portion is fastened to the first object, and the fastening element is fastened to or unfastened from the second object, thereby allowing two objects to be coupled together and separated repeatedly and rapidly.

The present disclosure further provides a fastener structure comprising a fastening element, a body portion and a resilient component. The fastening element comprises an operation portion and a fastening portion. The body portion and the fastening element are coupled together by a coupling portion. The resilient component has one end abutting against the fastening element and the other end abutting against the body portion, such that the fastening element undergoes resilient reciprocating motion.

The present disclosure further provides a fastener structure comprising two fastening elements and a body portion. Each fastening element comprises an operation portion and a fastening portion. Each fastening element is fastened to the body portion. The body portion and each fastening element are coupled together by one or more coupling portions.

The present disclosure further provides a fastener structure comprising two fastening elements and a body portion. Each fastening element comprises an operation portion and a fastening portion. Each fastening element is fastened to the body portion. The body portion is coupled to the fastening elements by one or more coupling portions. The body portion is coupled to the first object. Each fastening element is fastened to the second object.

The present disclosure further provides a fastener structure comprising two fastening elements, a body portion and a resilient component. Each fastening element comprises an operation portion and a fastening portion. Each fastening element is fastened to the body portion. The body portion is coupled to the fastening elements by one or more coupling portions. The resilient component has two ends abutting against the fastening elements, respectively, such that each fastening element undergoes resilient reciprocating motion.

Optionally, the body portion has a mounting portion. The fastening element is movably coupled to the mounting portion by the coupling portion. The mounting portion is a plane portion, recess portion, through hole or through recess.

Optionally, the fastening element is mounted on an outer side or the outside of the body portion, or the fastening element is mounted on an inner side or the inside of the body portion.

Optionally, a floating space is defined between the coupling portion and the fastening element or the body portion, such that the fastening element or the body portion moves within the floating space.

Optionally, the operation portion has a guiding surface, and the fastening portion has a corresponding guiding surface, such that the guiding surface of the operation portion abuts against the corresponding guiding surface of the fastening portion, thereby allowing the fastening portion to move.

Optionally, the guiding surface or the corresponding guiding surface is oblique, arcuate, curved or flat.

Optionally, the fastening portion of the fastening element is coupled to the body portion by the coupling portion, and the operation portion of the fastening element is coupled to the body portion by another coupling portion.

Optionally, the body portion has a mounting portion movably coupled to each fastening element by the coupling portion, and the mounting portion is a plane portion, recess portion, through hole or through recess.

Optionally, each fastening element is mounted on an outer side or the outside of the body portion, or the fastening element is mounted on an inner side or the inside of the body portion.

Optionally, floating space is defined between the coupling portion and each fastening element or the body portion, such that each fastening element or the body portion moves within the floating space.

Optionally, the operation portion has two guiding surfaces, and each fastening portion has a corresponding guiding surface, such that the guiding surfaces of the operation portion push the corresponding guiding surfaces of the fastening portions, thereby allowing each fastening portion to move.

Optionally, the body portion and the fastening element are coupled together by at least one coupling portion.

Optionally, the fastener structure further comprises another fastening element. The fastening element abuts against the another fastening element. The fastener structure has another resilient component. The another resilient component has one end abutting against the another fastening element and another end abutting against the body portion.

Optionally, the body portion is fastened to another resilient component. The another resilient component has one end abutting against the another fastening element and another end abutting against the body portion.

The present disclosure further provides a fastener structure comprising a fastening element and a body portion. The fastening element has an operation portion and a fastening portion. The body portion has a mounting portion. The fastening element is penetratingly disposed at the mounting portion. The body portion and the fastening element are coupled together by a coupling portion.

The present disclosure further provides a fastener structure comprising a fastening element and a body portion. The fastening element has an operation portion and a fastening portion. The body portion has a mounting portion. The fastening element is penetratingly disposed at the mounting portion. The body portion and the fastening element are coupled together by a coupling portion. The body portion is coupled to the first object. The fastening portion is fastened to the second object.

The present disclosure further provides a fastener structure comprising a fastening element, a body portion and resilient component. The fastening element has an operation portion and a fastening portion. The body portion has a mounting portion. The fastening element is penetratingly disposed at the mounting portion. The body portion and the fastening element are coupled together by a coupling portion. The resilient component has one end abutting against the fastening element and another end abutting against the body portion, such that the fastening element undergoes resilient reciprocating motion.

The present disclosure further provides a fastener structure comprising two fastening elements and a body portion. Each fastening element has an operation portion and a fastening portion. The body portion has a mounting portion. Each fastening element is penetratingly disposed at the mounting portion. The body portion and each fastening element are coupled together by a coupling portion.

The present disclosure further provides a fastener structure comprising two fastening elements and a body portion. Each fastening element has an operation portion and a fastening portion. The body portion has a mounting portion. Each fastening element is penetratingly disposed at the mounting portion. The body portion and each fastening element are coupled together by a coupling portion. The body portion is coupled to the first object. Each fastening portion is fastened to the second object.

The present disclosure further provides a fastener structure comprising two fastening elements, a body portion and a resilient component. Each fastening element has an operation portion and a fastening portion. The body portion has a mounting portion. Each fastening element is penetratingly disposed at the mounting portion. The body portion and each fastening element are coupled together by a coupling portion. The resilient component has two ends abutting against the fastening elements, respectively, such that each fastening element undergoes resilient reciprocating motion.

Optionally, the body portion has a fitting portion fitted to the first object.

Optionally, the body portion is fitted to the first object, and the fastening portion is fastened to the second object.

Optionally, the fastener structure further comprises a resilient component, the resilient component having one end abutting against the fastening element and another end abutting against the body portion, such that the fastening element undergoes resilient reciprocating motion.

Optionally, the operation portion has a handle portion.

Optionally, the operation portion or the handle portion has an anti-slip portion.

Optionally, the coupling portion is a bolt for fastening the body portion and the fastening element together.

Optionally, the fastening portion is a hook fastener, columnar structure, raised fastener, dented fastener, thread structure or resilient fastener.

Optionally, the mounting portion is a through hole or through recess.

Optionally, the fastener structure further comprises a resilient component. The resilient component has two ends abutting against the fastening elements, respectively, such that each fastening element undergoes resilient reciprocating motion.

Optionally, the resilient component is a helical spring, resilient columnar structure, torsion spring, extension spring or leaf spring.

Optionally, the fitting portion is riveted, expanded, welded, locked or fastened to the first object.

Optionally, the fastening element or body portion has a holding portion, and the holding portion holds a resilient component.

Optionally, the coupling portion is jointed to or fitted around the resilient component.

Optionally, the resilient component is a torsion spring with one end abutting against the fastening element and another end abutting against the body portion.

Optionally, the resilient component is a torsion spring with two ends abutting against the fastening elements, respectively.

Optionally, the fitting portion has a storage space, and the body portion is pressed under an applied force, such that the material of the first object enters or flows into the storage space, thereby allowing the body portion and the first object to be coupled together.

Optionally, the fitting portion has an engaging portion, the engaging portion is pressed under an applied force, such that the engaging portion is deformed and engaged with the first object, thereby allowing the body portion and the first object to be coupled together.

Optionally, the body portion has a stamped surface or abutting surface.

Optionally, the fitting portion is a dented structure, raised structure, stepped structure, oblique structure, planar structure, curved structure or arcuate structure.

Optionally, the operation portion is a wing structure, raised structure, dented structure, oblique structure, stepped structure, planar structure, curved structure, arcuate structure, columnar structure or fastening structure.

Optionally, the fastener structure is taken out of a carrier with a tool and then placed on the first object to facilitate coupling together the first and second objects.

Optionally, the body portion has a weldable surface, and the fastener structure is taken out of the carrier with the tool and then placed on the first object so as to be welded and coupled to the first object.

Optionally, the fastener structure is taken out of the carrier with the tool. Then, the predetermined positions of the fastener structure and the first object are calculated with a corresponding device, such that the tool is precisely placed on the first object, thereby allowing the fastener structure to be coupled to the first object.

Optionally, the tool is a clamp, vacuum suction device or magnetic suction device.

Optionally, the corresponding device is a visual comparison device, image comparison device or distance calculation device.

Optionally, the holding portion is a recess portion, hole portion, dented portion, raised portion or stepped portion Optionally, the operation portions of the fastening elements simultaneously move inward, such that the fastening portions simultaneously move in a direction conducive to unfastening.

Optionally, the body portion is coupled to the first object, and each fastening portion is fastened to the second object. The operation portions of the fastening elements simultaneously move inward, such that the fastening portions simultaneously move in the direction conducive to unfastening, thereby allowing each fastening portion to be unfastened from the second object.

Optionally, the operation portion of the fastening element moves in a direction, such that the fastening portion moves in a direction conducive to unfastening.

Optionally, the body portion is coupled to the first object, and the fastening portion is fastened to the second object. The operation portion of the fastening element moves in a direction, such that the fastening portion moves in a direction conducive to unfastening, thereby allowing the fastening portion to be unfastened from the second object.

Optionally, the fastening portion has a guiding portion for guiding the corresponding fastening portion of the second object in being fastened to the fastening portion.

Optionally, the fastening portion is fastened to the second object, and the second object has a corresponding fastening portion which the fastening portion is fastened to. The corresponding fastening portion has a wide hole portion and a fastened portion. The wide hole portion is larger than the fastening portion. The fastened portion is smaller than the fastening portion. After penetrating the wide hole portion, the fastening portion is fastened to the fastened portion.

Optionally, the mounting portion has a laterally closed structure with a vertically open space, such that the fastening element moves within the vertically open space of the laterally closed structure.

Optionally, the fastening element has a rod portion of a smaller width than the fastening portion.

Optionally, the fastening element has a rod portion of a smaller width than the fastening portion to allow the fastening portion to penetrate the second object, and then the rod portion of a smaller width than the fastened portion is fastened to the fastened portion of the second object, such that the fastening portion holds the second object.

Optionally, the coupling portion is a raised portion, dented portion, bolt, hole portion, annular portion, annular structure, recess portion or fastener. Alternatively, the coupling portion and the body portion are integrally formed. Alternatively, the coupling portion and the fastening element are integrally formed.

Optionally, the body portion or fastening element has a movable portion, such that the body portion, fastening element or coupling portion moves within the movable portion vertically, laterally or rotatably.

Optionally, the fastening portion moves within the movable portion to thereby move vertically, laterally or rotatably and thus is fastened to the second object. Alternatively, the fastening portion moves within the movable portion to thereby move vertically and then move laterally or rotatably so as to be fastened to the second object. Alternatively, the fastening portion moves within the movable portion to thereby move laterally and then move vertically or rotatably so as to be fastened to the second object. Alternatively, the fastening portion moves within the movable portion to thereby move rotatably and then move vertically or laterally so as to be fastened to the second object.

Optionally, the fastening portion is vertically, laterally or rotatably fastened to the second object.

Optionally, a floating displacement is defined between the body portion and the fastening element, between the body portion and the coupling portion, or between the fastening element and the coupling portion.

Optionally, the floating displacement is in a lateral, vertical or rotational direction.

Optionally, the fastener structure further comprises another fastening element, and the fastening element abuts against the another fastening element, such that the another fastening element is fastened thereto. The fastener structure further comprises another resilient component with one end abutting against the another fastening element and another end abutting against the body portion.

Optionally, the body portion is fastened to another resilient component with an end abutting against the another fastening element and another end abutting against the body portion.

Optionally, the body portion and the fastening element are coupled together with at least one coupling portion.

BRIEF DESCRIPTION OF THE DRAWINGS

Embodiments of the present disclosure are depicted by the accompanying drawings and described below. However, the accompanying drawings are not restrictive of the present disclosure. Therefore, persons skilled in the art can come up with any other drawings based on the accompanying drawings without making any creative efforts.

DETAILED DESCRIPTION OF THE INVENTION

To facilitate understanding of the object, characteristics and effects of this present disclosure, embodiments together with the attached drawings for the detailed description of the present disclosure are provided.

A fastener structure is provided according to embodiments of the present disclosure, depicted by accompanying drawings and described below.

Figure 1:
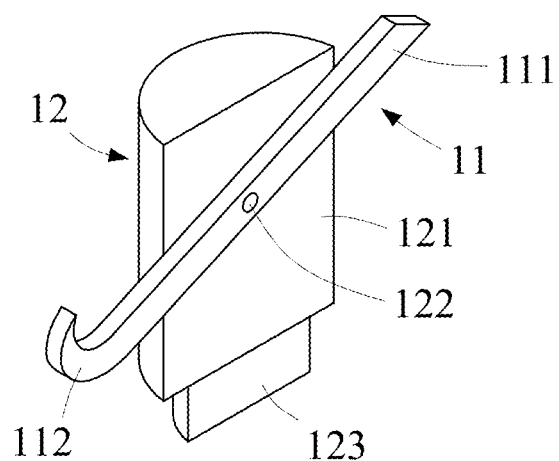
FIG. 1 is a perspective view of a fastener structure according to the first embodiment of the present disclosure.

Referring to FIG. 1, the present disclosure provides a fastener structure 1 comprising a fastening element 11 and a body portion 12.

The fastening element 11 comprises an operation portion 111 and a fastening portion 112.

The fastening element 11 is fastened to the body portion 12. The body portion 12 and the fastening element 11 are coupled together by a coupling portion 122.

The operating principle of the fastener structure of the present invention is described below. The body portion 12 is coupled to the first object (not shown). Then, the operation portion 111 of the fastening element 11 is manipulated in one direction, such that the fastening portion 112 is fastened to the second object (not shown). To remove the second object, the user manipulates the operation portion 111 of the fastening element 11 in another direction, such that the fastening portion 112 is removed from the second object, thereby allowing the first object and the second object to be coupled together and separated repeatedly and rapidly.

In a preferred embodiment of the present disclosure, the body portion 12 has a mounting portion 121, and the fastening element 11 is movably coupled to the mounting portion 121 by the coupling portion 122. In this embodiment, the mounting portion 121 is a plane portion, and the fastening element 11 is mounted on an outer side or the outside of the body portion 12. Therefore, the present disclosure meets practical needs.

In a preferred embodiment of the present disclosure, the body portion 12 has a fitting portion 123, and the fitting portion 123 is fitted to the first object by being riveted, expanded, welded, locked or fastened to the first object. The fitting portion 123 is a dented structure, raised structure, stepped structure, oblique structure, planar structure, curved structure or arcuate structure. Therefore, the fitting portion 123 of the body portion 12 is firmly coupled to the first object.

Figure 2:
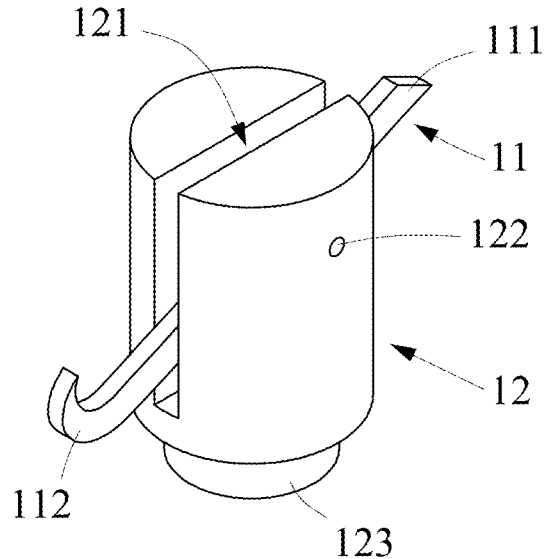
FIG. 2 is a perspective view of the fastener structure according to the second embodiment of the present disclosure.

Referring to FIG. 2, in a preferred embodiment of the present disclosure, the mounting portion 121 of the body portion 12 is a recess portion, and the fastening element 11 is movably coupled to the mounting portion 121 by the coupling portion 122, such that the fastening element 11 is mounted on an inner side or the inside of the body portion 12. Similarly, the fitting portion 123 of the body portion 12 is coupled to the first object (not shown), and then the user manipulates the operation portion 111 of the fastening element 11 in one direction, such that the fastening portion 112 is fastened to a second object (not shown). To remove the second object with the fastening portion 112, the user manipulates the operation portion 111 of the fastening element 11 in the other direction, thereby allowing the first object and the second object to be coupled together and separated repeatedly and rapidly.

Figure 3:
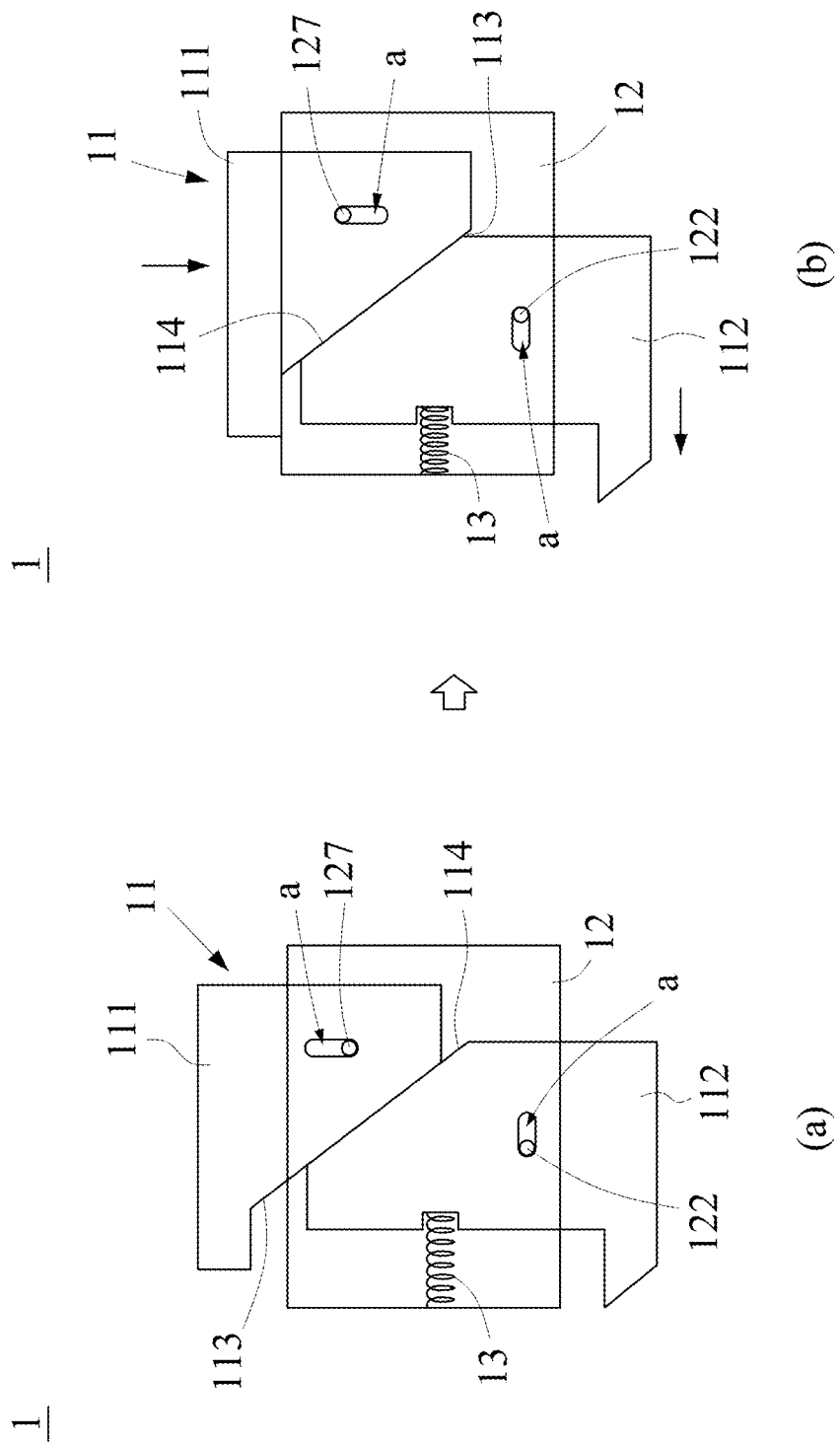
FIG. 3(a) and FIG. 3(b) are schematic views of the fastener structure according to the third embodiment of the present disclosure.

Referring to FIG. 3, in a preferred embodiment of the present disclosure, the operation portion 111 has a guiding surface 113, and the fastening portion 112 has a corresponding guiding surface 114. The fastening portion 112 of the fastening element 11 is coupled to the body portion 12 by the coupling portion 122. The operation portion 111 of the fastening element 11 is coupled to the body portion 12 by another coupling portion 127. A floating space a is defined between the coupling portion 122 and the fastening portion 112 and between the another coupling portion 127 and the operation portion 111, such that both the fastening portion 112 and the operation portion 111 move within the floating space a. The fastener structure 1 has a resilient component 13 with one end abutting against the fastening portion 112 of the fastening element 12 and the other end abutting against the body portion 12, such that the fastening portion 112 undergoes resilient reciprocating motion.

To start using the fastener structure, the user manipulates the body portion 12 in such a manner that the body portion 12 is coupled to the first object (not shown), and then the user presses the operation portion 111 to cause the guiding surface 113 thereof to push the corresponding guiding surface 114 of the fastening portion 112 and thus cause the fastening portion 112 to move, such that the fastening portion 112 is fastened to the second object, thereby allowing the resilient component 13 to be in a compressed state. As soon as the press stops, the resilient component 13 expands and automatically causes the fastening portion 112 to restore its initial position, such that the fastening portion 112 removes the second object, thereby allowing the first object and the second object to be coupled together and separated repeatedly and rapidly.

In a preferred embodiment of the present disclosure, the guiding surface 113 or the corresponding guiding surface 114 is oblique, arcuate, curved or flat. Therefore, the present disclosure meets practical needs.

Figure 4:
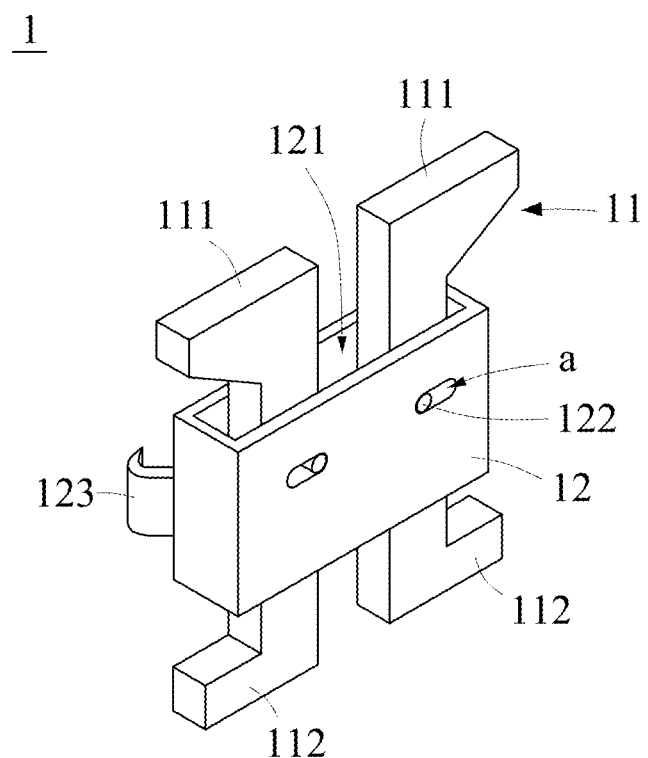
FIG. 4 is a perspective view of the fastener structure according to the fourth embodiment of the present disclosure.

Referring to FIG. 4, in a preferred embodiment of the present disclosure, the fastener structure 1 comprises two fastening elements 11 and a body portion 12. The mounting portion 121 of the body portion 12 is a through hole (recess portion or through recess), such that each fastening element is mounted on an inner side or the inside of the body portion 12. The fastening elements 11 are coupled to the body portion 12 by one or more coupling portions 122. The floating space a is defined between the body portion 12 and each coupling portion 122, such that the fastening element 11 moves within the floating space a.

To start using the fastener structure, the user makes the body portion 12 coupled to the first object (not shown) by the fitting portion 123 and then manipulates the operation portions 111 of the fastening elements 11 in opposite directions to allow each fastening element 11 to move within the floating space a, such that each fastening portion 112 is fastened to a second object (not shown). To remove the second object, the user manipulates the operation portions 111 of the fastening elements 11 in the same direction to allow each fastening element 11 to move within the floating space a, such that each fastening portion 112 removes the second object, thereby allowing the first object and the second object to be coupled together and separated repeatedly and rapidly.

Figure 5:
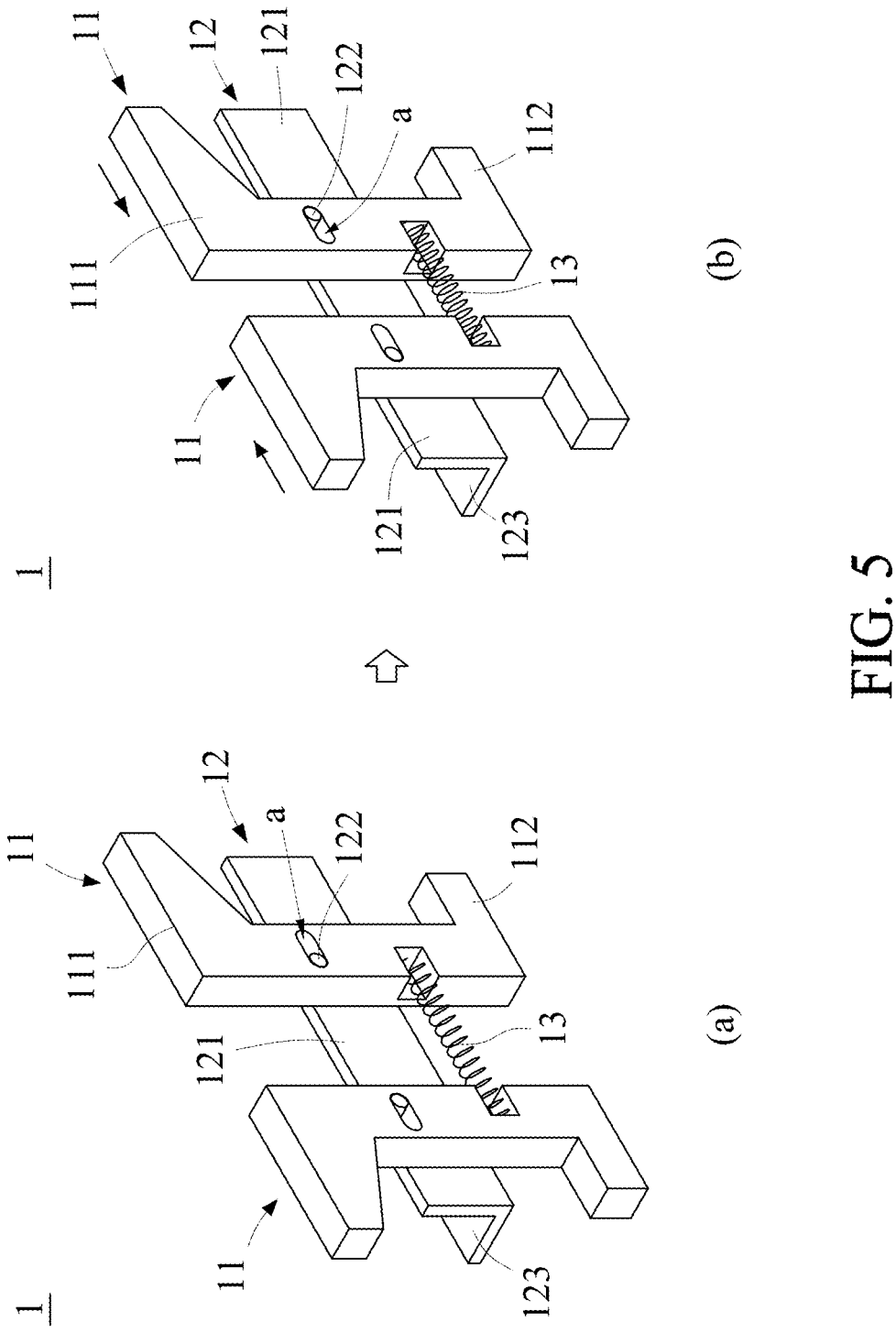
FIG. 5(a) and FIG. 5(b) are schematic views of the fastener structure according to the fifth embodiment of the present disclosure.

Referring to FIG. 5, in a preferred embodiment of the present disclosure, the fastener structure 1 comprises two fastening elements 11 and a body portion 12. The mounting portion 121 of the body portion 12 is a plane portion. Consequently, each fastening element is mounted on an outer side or the outside of the body portion 12, and the fastening elements 11 are coupled together by one or more coupling portions 122. The floating space a is defined between the body portion 12 and each coupling portion 122, such that the fastening element 11 moves within the floating space a. The fastener structure 1 has the resilient component 13 with two ends abutting against the fastening elements 11, respectively, such that each fastening element 11 undergoes resilient reciprocating motion.

To start using the fastener structure, the user manipulates in such a manner to allow the fitting portion 123 of the body portion 12 to be coupled to the first object (not shown) and then manipulates the operation portions 111 of the fastening elements 11 in the same direction, such that each fastening element 11 moves within the floating space a. The fastener structure 1 compresses the resilient component 13 to be aligned with a second object (not shown), and then the user releases each operation portion 111 to allow the resilient component 13 to push each fastening element 11 because of resilience release, such that each fastening portion 112 is fastened to the second object. To remove the second object, the user manipulates the operation portions 111 of the fastening elements 11 in the same direction, such that each fastening element 11 moves within the floating space a and compresses the resilient component 13 to allow each fastening portion 112 to remove the second object. Then, the user releases each operation portion 111. Consequently, owing to resilience release, the resilient component 13 pushes each fastening element 11 and causes it to restore its initial position for lateral use, thereby allowing the first object and the second object to be coupled together and separated repeatedly and rapidly.

Figure 6:
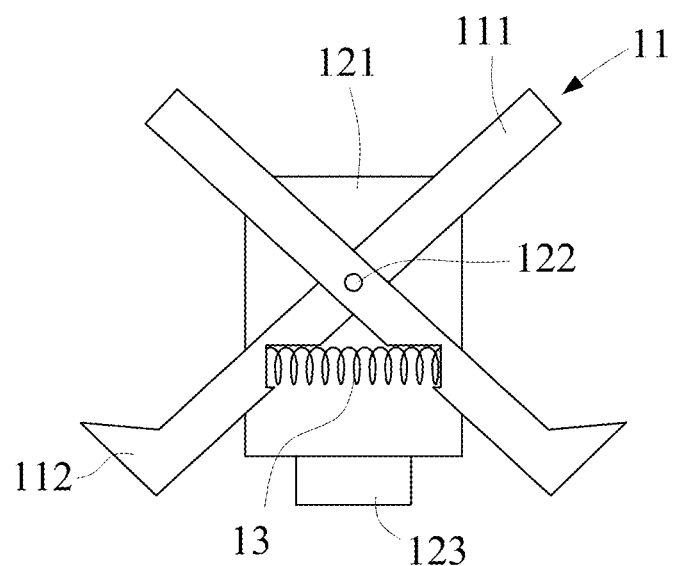
FIG. 6 is a perspective view of the fastener structure according to the sixth embodiment of the present disclosure.

Referring to FIG. 6, in a preferred embodiment of the present disclosure, the fastener structure 1 comprises two fastening elements 11 and a body portion 12. The mounting portion 121 of the body portion 12 is a plane portion. The fastening elements 11 are movably coupled to the mounting portion 121 by one or more coupling portions 122, such that the fastening elements 11 are mounted on an outer side or the outside of the body portion 12. The fastener structure 1 has the resilient component 13 with two ends abutting against the fastening elements 11, respectively, such that each fastening element 11 undergoes resilient reciprocating motion.

To start using the fastener structure, the user manipulates in such a manner so as for the body portion 12 to be coupled to the first object (not shown) by the fitting portion 123. After that, the user manipulates the operation portions 111 of the fastening elements 11 in the same direction and compresses the resilient component 13 to be aligned with the second object (not shown). Then, the user releases each operation portion 111. Consequently, owing to resilience release, the resilient component 13 pushes each fastening element 11, such that each fastening portion 112 is fastened to the second object. To remove the second object, the user manipulates the operation portions 111 of the fastening elements 11 in the same direction and compresses the resilient component 13, such that each fastening portion 112 removes the second object. After that, the user releases each operation portion 111. Consequently, owing to resilience release, the resilient component 13 pushes each fastening element 11 to cause it to restore its initial position for lateral use, thereby allowing the first object and the second object to be coupled together and separated repeatedly and rapidly.

Figure 7:
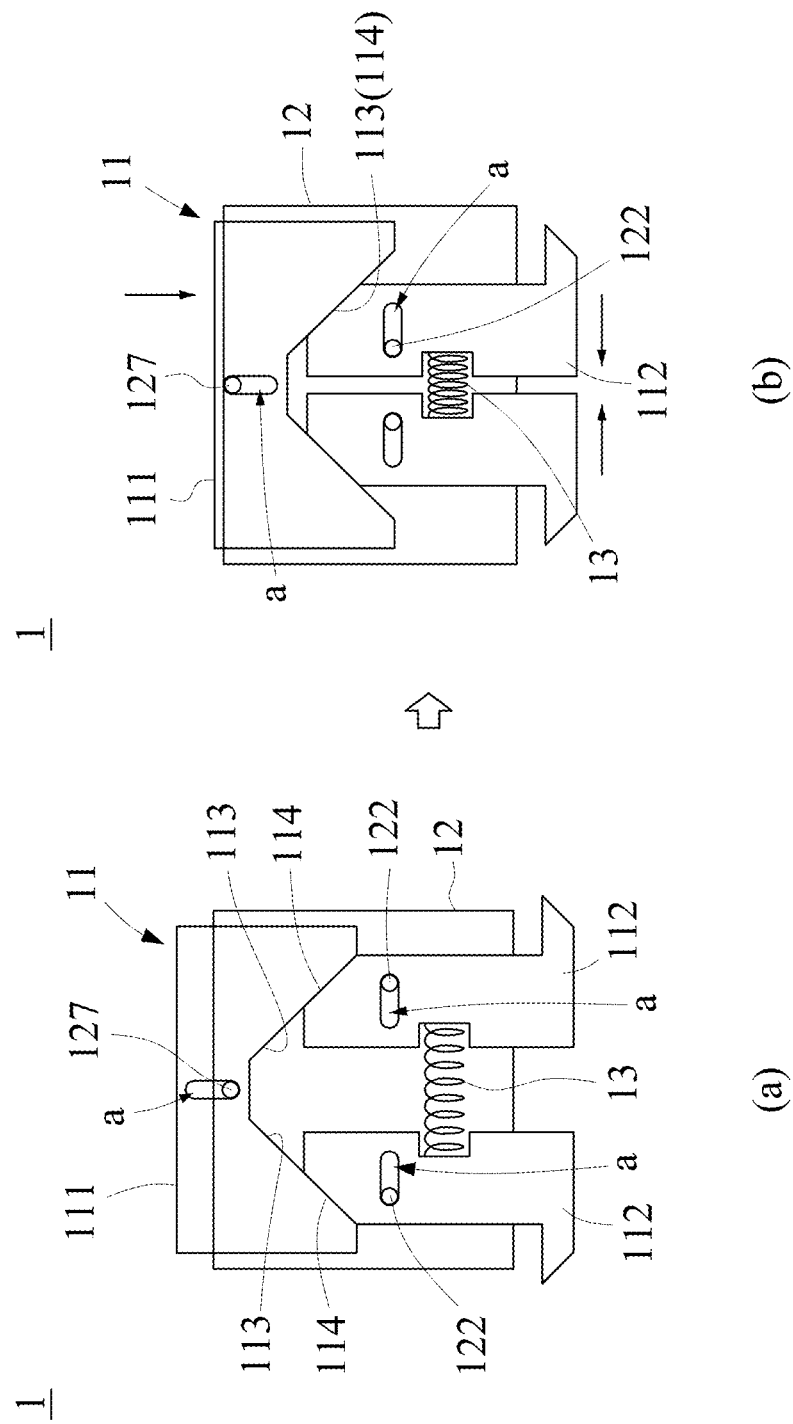
FIG. 7(a) and FIG. 7(b) are perspective views of the fastener structure according to the seventh embodiment of the present disclosure.

Referring to FIG. 7, in a preferred embodiment of the present disclosure, the operation portion 111 has two guiding surfaces 113, and each fastening portion 112 has the corresponding guiding surface 114. The fastening portion 112 of each fastening element 11 is coupled to the body portion 12 by the coupling portion 122. The operation portion 111 of each fastening element 11 is coupled to the body portion 12 by another coupling portion 127. The floating space a is defined between the coupling portion 122 and the fastening portion 112 and between the another coupling portion 127 and the operation portion 111, such that each fastening portion 112 and the operation portion 111 move within the floating space a. The fastener structure 1 has the resilient component 13 with two ends abutting against the fastening portions 112, respectively, such that the fastening portion 112 undergoes resilient reciprocating motion.

To start using the fastener structure, the user manipulates in such a manner so as for the body portion 12 to be coupled to the first object (not shown) and then presses the operation portion 111, such that the guiding surface 113 of the operation portion 111 pushes the corresponding guiding surface 114 of the fastening portion 112 to allow the fastening portion 112 to move, thereby allowing the fastening portion 112 to be fastened to a second object (not shown). At this point in time, the resilient component 13 is in a compressed state. As soon the press is released, the resilient component 13 is released and automatically causes each fastening portion 112 to restore its initial position, such that each fastening portion 112 removes the second object, thereby allowing the first object and the second object to be coupled together and separated repeatedly and rapidly.

Figure 8:
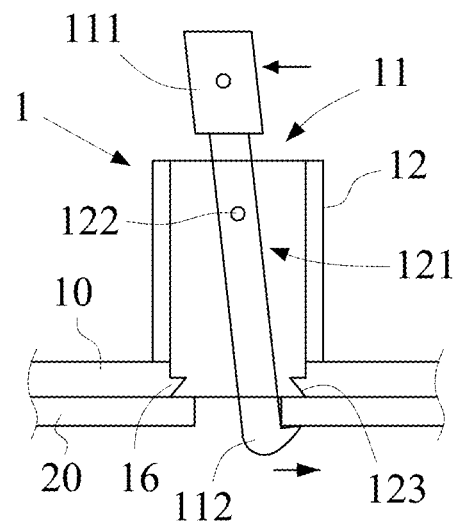
FIG. 8 is a schematic view of FIG. 1 the eighth embodiment of the present disclosure.
Figure 9:
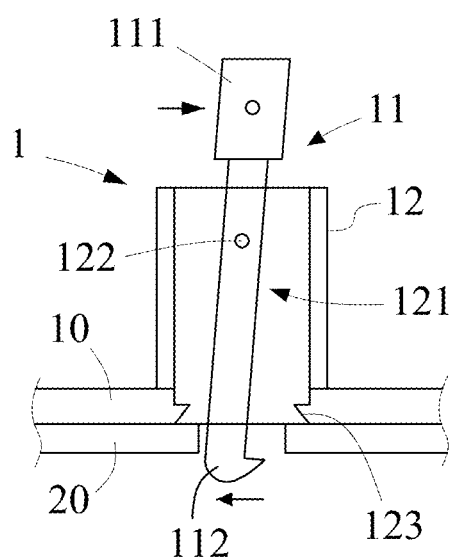
FIG. 9 is another schematic view of the fastener structure according to the eighth embodiment of the present disclosure.

Referring to FIG. 8 and FIG. 9, the present disclosure provides a fastener structure 1 comprising a fastening element 11 and a body portion 12.

The fastening element 11 has the operation portion 111 and the fastening portion 112.

The body portion 12 has a mounting portion 121. The mounting portion 121 is the internal space of the body portion 12. The fastening element 11 is penetratingly disposed at the mounting portion 121. The body portion 12 and the fastening element 11 are coupled together by the coupling portion 122.

To start using the fastener structure, the user places the body portion 12 on the first object 10 and presses the operation portion 111 of the fastening element 11 in one direction. As a result, the operation portion 111 moves inward, such that the fastening portion 112 of the fastening element 11 moves in the other direction and is fastened to a second object 20 (shown in FIG. 1). Alternatively, the user presses the operation portion 111 of the fastening element 11 in the other direction, such that the fastening portion 112 of the fastening element 11 moves in the direction conducive to unfastening so as to be unfastened from the second object 20 (shown in FIG. 2), thereby allowing two objects (the first object 10 and the second object 20) to be coupled together and separated repeatedly and rapidly.

In a preferred embodiment of the present disclosure, the body portion 12 has a fitting portion 123, and the fitting portion 123 is fitted to a fitted portion 16 of the first object 10 by being riveted, expanded, welded, locked or is fastened to the first object 10. The fitting portion 123 is a dented structure, raised structure, stepped structure, oblique structure, planar structure, curved structure or arcuate structure. The fitting portion 123 of the body portion 12 is firmly coupled to the first object 10.

In a preferred embodiment of the present disclosure, the coupling portion 122 is a bolt for fastening the body portion 12 and the fastening element 11 together. Owing to the coupling portion 122, the fastening element 11 moves within the mounting portion 121, thereby allowing two objects (the first object 10 and the second object 20) to be coupled together and separated repeatedly and rapidly.

In a preferred embodiment of the present disclosure, the mounting portion 121 is a through hole or through recess. The mounting portion 121 has a laterally closed structure with vertically open space, such that the fastening element 11 moves within the vertically open space of the laterally closed structure, thereby allowing two objects (the first object 10 and the second object 20) to be coupled together and separated repeatedly and rapidly.

In a preferred embodiment of the present disclosure, the operation portion 111 is a wing structure, raised structure, dented structure, oblique structure, stepped structure, planar structure, curved structure, arcuate structure, columnar structure or fastening structure. Therefore, the operation portion 111 meets the need for practical operation.

In a preferred embodiment of the present disclosure, the coupling portion 122 is a raised portion, dented portion, bolt, hole portion, annular portion, annular structure, recess portion or fastener. Alternatively, the coupling portion 122 and the body portion 12 are integrally formed. Alternatively, the coupling portion 122 and the fastening element 11 are integrally formed. Therefore, the coupling portion 122 meets the need for practical operation. In a preferred embodiment of the present disclosure, the coupling portion 122 is a bolt.

Figure 10:
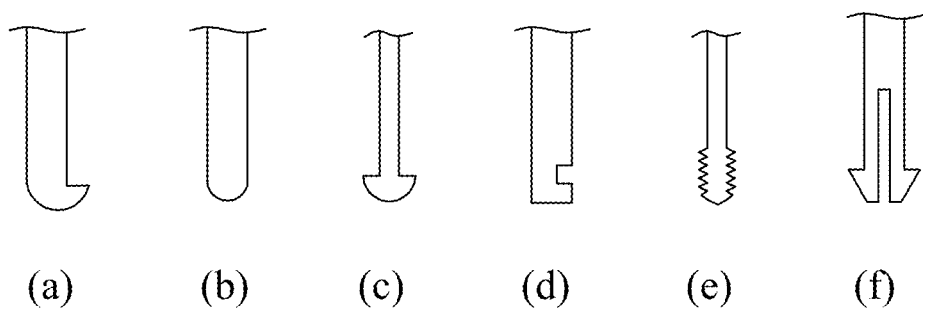
FIG. 10(a)-FIG. 10(f) are schematic views of various forms of a fastening portion of the present disclosure.

Referring to FIG. 10, in a preferred embodiment of the present disclosure, the fastening portion 112 is a hook fastener (indicated by a in FIG. 3), columnar structure (indicated by b in FIG. 3), raised fastener (indicated by c in FIG. 3), dented fastener (indicated by d in FIG. 3), thread structure (indicated by e in FIG. 3) or resilient fastener (indicated by f in FIG. 3). Therefore, the fastening portion 112 can be coupled to the second object 20.

Figure 11:
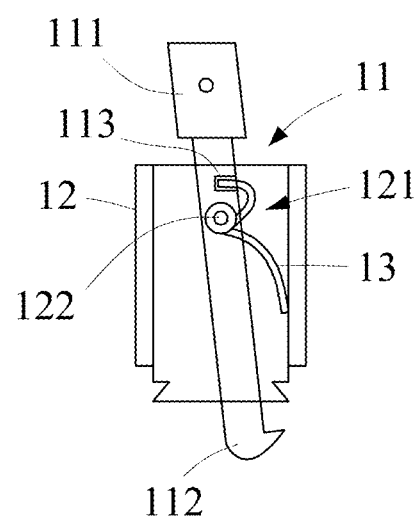
FIG. 11 is a cross-sectional view of the fastener structure according to the ninth embodiment of the present disclosure.
Figure 12:
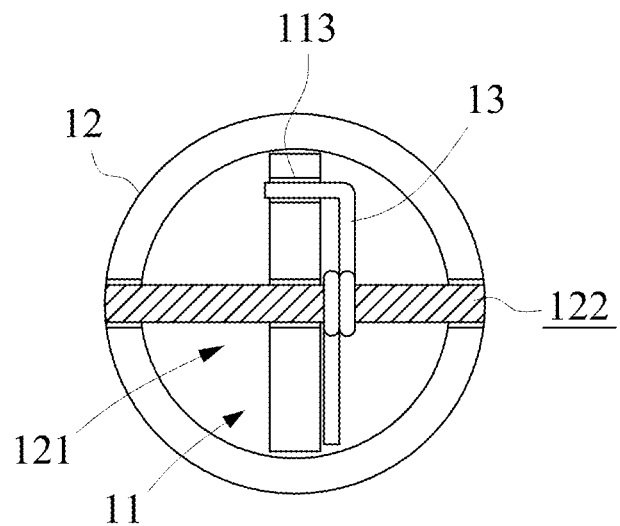
FIG. 12 is a top view of the fastener structure according to the ninth embodiment of the present disclosure.
Figure 13:
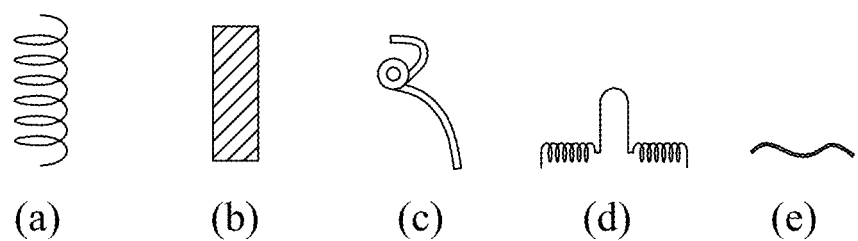
FIG. 13(a)-FIG. 13(e) are schematic views of various forms of a resilient component of the present disclosure.

Referring to FIG. 11 through FIG. 13, in a preferred embodiment of the present disclosure, the fastener structure further comprises a resilient component 13. The resilient component 13 is a torsion spring. The resilient component 13 has one end abutting against the fastening element 11 and the other end abutting against the body portion 12. The coupling portion 122 is jointed to or fitted around the resilient component 13. The fastening element 11 has a holding portion 113 for holding the resilient component 13. Therefore, the user presses the operation portion 111 of the fastening element 11 in one direction to allow the operation portion 111 to move inward; thus, the fastening portion 112 of the fastening element 11 moves in another direction and is fastened to a second object (not shown). At this point in time, the resilient component 13 is in a resilience release state. Hence, in the presence of the resilient component 13, the fastening portion 112 is fastened to the second object firmly. When the user presses the operation portion 111 of the fastening element 11 in another direction, the fastening portion 112 of the fastening element 11 moves in the direction conducive to unfastening and thus gets unfastened from (not shown) the second object. At this moment, the resilient component 13 is in the resilient compressed state. After the fastening portion 112 of the fastening element 11 has separated from the second object 20, the resilient component 13 returns to the resilience release state, such that the fastening element 11 undergoes resilient reciprocating motion within the mounting portion 121, so as to couple together and separate the first and second objects 10, 20 repeatedly and rapidly. A floating displacement (gap) is defined between the body portion 12 and the fastening element 11. Alternatively, a floating displacement (gap) is defined between the body portion 12 and the coupling portion 122. Alternatively, a floating displacement (gap) is defined between the fastening element 11 and the coupling portion 122. The floating displacement is lateral or vertical, and the floating displacement ranges from 0.001 mm to 50 mm.

In a preferred embodiment of the present disclosure, the holding portion 113 is a recess portion, hole portion, dented portion, raised portion or stepped portion. Therefore, the holding portion 113 meets different usage needs.

In a preferred embodiment of the present disclosure, the resilient component 13 is a helical spring (indicated by a in FIG. 13), resilient columnar structure (indicated by b in FIG. 13), torsion spring (indicated by c in FIG. 13), extension spring (indicated by d in FIG. 13) or leaf spring (indicated by e in FIG. 13). Therefore, the resilient component 13 meets different usage needs.

Figure 14:
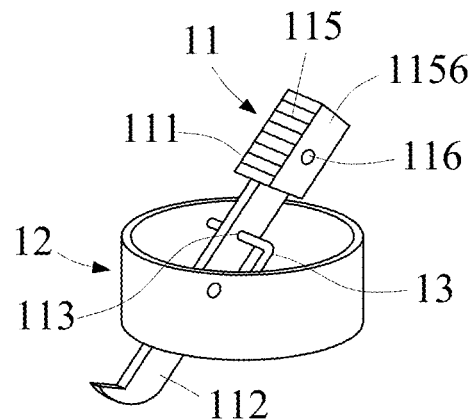
FIG. 14 is a perspective view of the fastener structure according to the tenth embodiment of the present disclosure.

Referring to FIG. 14, in a preferred embodiment of the present disclosure, the operation portion 111 of the fastening element 11 has a handle portion 1156. The operation portion 111 or the handle portion 1156 has an anti-slip portion 115. The operation portion 111 has a joint portion 116 whereby the operation portion 111 is coupled to the fastening portion 112. The resilient component 13 is held at the holding portion 113. Therefore, owing to the anti-slip portion 115, the operation portion 111 or the handle portion 1156 is easy to operate. Furthermore, the fastening element 11 and the resilient component 13 allow two objects to be coupled together and separated repeatedly and rapidly.

Figure 15:
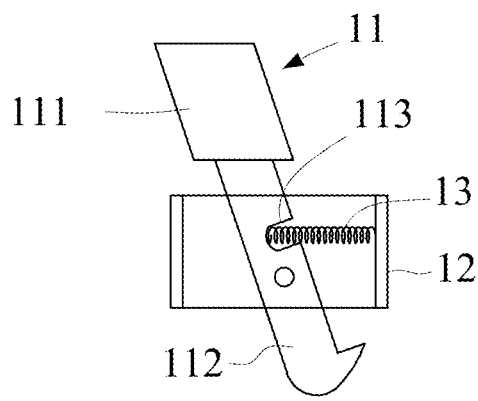
FIG. 15 is a schematic view of the fastener structure of FIG. 1 according to the eleventh embodiment of the present disclosure.
Figure 16:
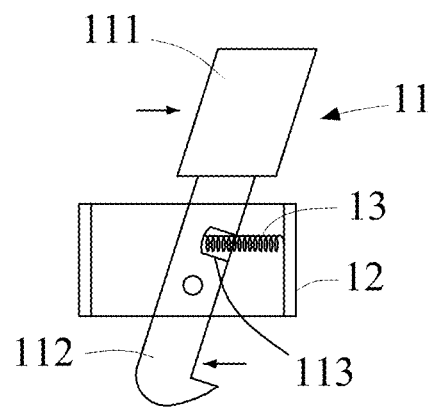
FIG. 16 is another schematic view of the fastener structure according to the eleventh embodiment of the present disclosure.

Referring to FIG. 15 and FIG. 16, in a preferred embodiment of the present disclosure, the resilient component 13 has one end abutting against the holding portion 113 and the other end abutting against the body portion 12. Therefore, the fastening element 11 and the resilient component 13 also enable two objects to be coupled together and separated repeatedly and rapidly. A floating displacement is defined between the body portion 12 and the fastening element 11. The floating displacement is a rotational direction, and the floating displacement ranges from 0.001 mm to 50 mm.

Figure 17:
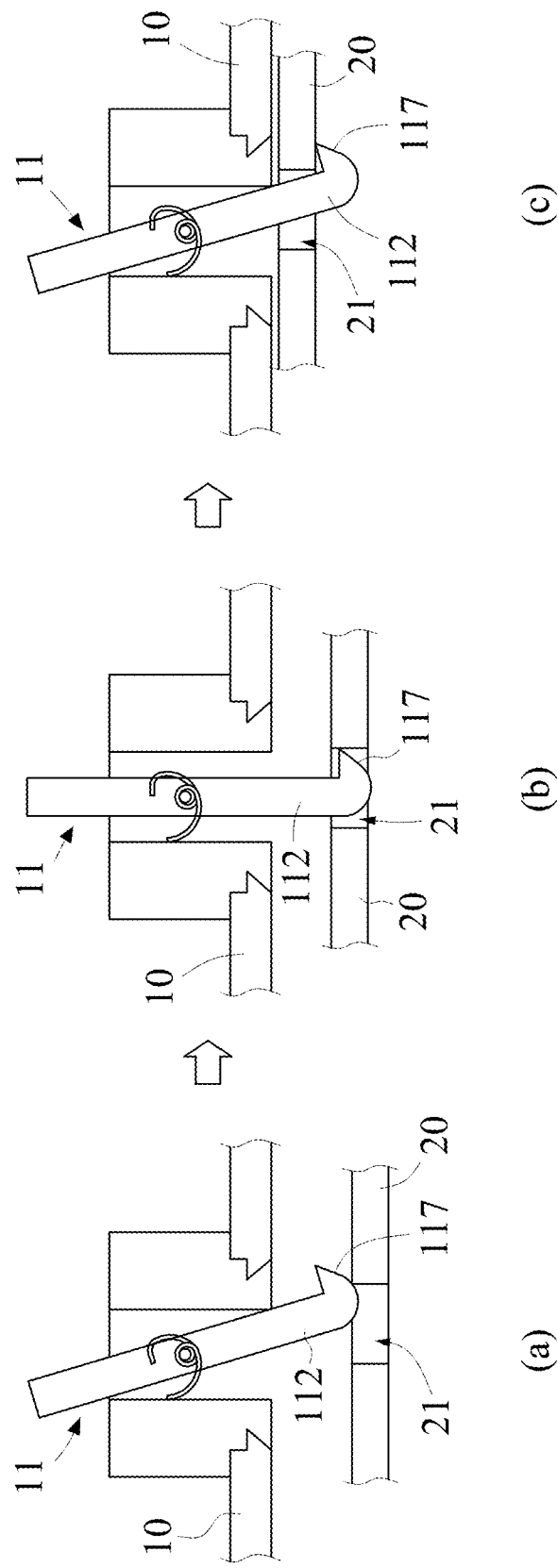
FIG. 17(a)-FIG. 17(c) are schematic views of the fastener structure according to the twelfth embodiment of the present disclosure.

Referring to FIG. 17, in a preferred embodiment of the present disclosure, the fastening portion 112 of the fastening element 11 has a guiding portion 117. The guiding portion 117 guides a corresponding fastening portion 21 of the second object 20 in engaging with the fastening portion 112, thereby allowing the first object 10 and the second object 20 to be coupled together repeatedly and rapidly.

Figure 18:
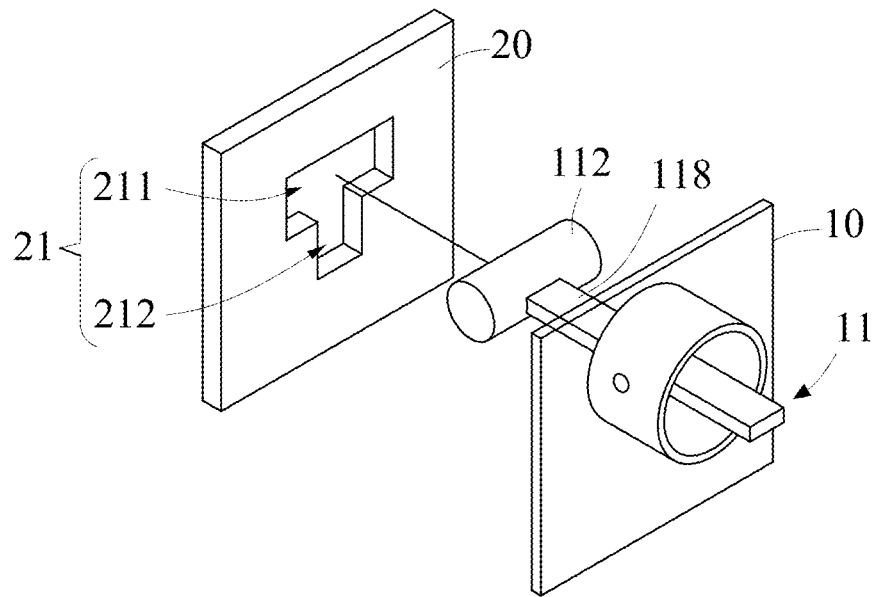
FIG. 18 is a perspective view of the fastener structure according to the thirteen embodiment of the present disclosure.
Figure 19:
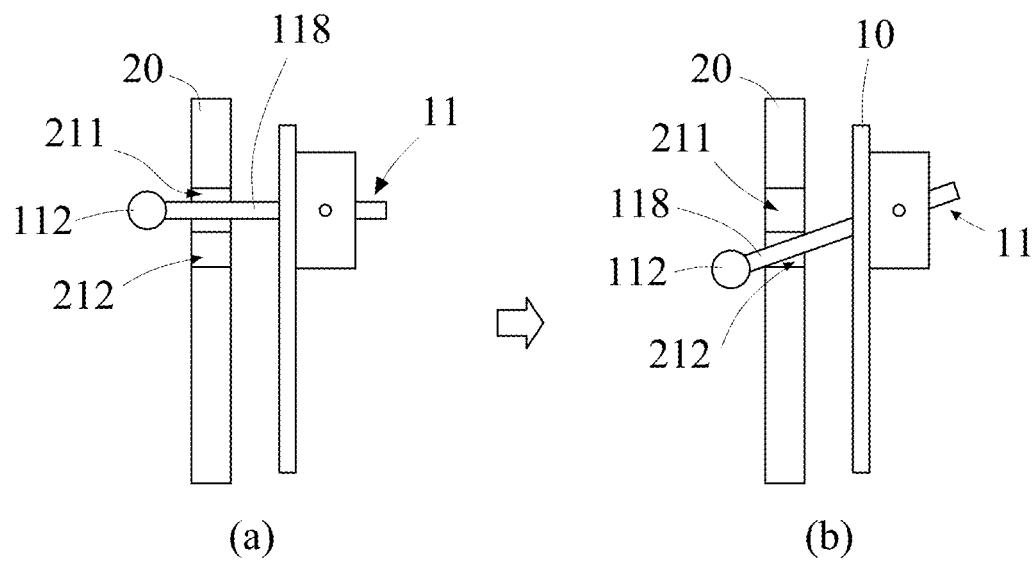
FIG. 19(a) and FIG. 19(b) are schematic views of the fastener structure according to the thirteen embodiment of the present disclosure.

Referring to FIG. 18 and FIG. 19, in a preferred embodiment of the present disclosure, the fastening portion 112 of the fastening element 11 is fastened to the second object 20. The second object 20 has a corresponding fastening portion 21 which the fastening portion 112 is fastened to. The corresponding fastening portion 21 has a wide hole portion 211 and a fastened portion 212. The wide hole portion 211 is larger than the fastening portion 112. The fastened portion 212 is smaller than the fastening portion 112. The fastening portion 112 penetrates the wide hole portion 211 and then is fastened to the fastened portion 212. The fastening element 11 has a rod portion 118. The width of the rod portion 118 is smaller than the width of the fastening portion 112, such that the fastening portion 112 penetrates the wide hole portion 211. The rod portion 118 whose width is less than the fastened portion 212 is fastened to the fastened portion 212. The fastening portion 112 is fastened to the fastened portion 212, thereby allowing the first object 10 and the second object 20 to be coupled together repeatedly and rapidly.

Figure 20:
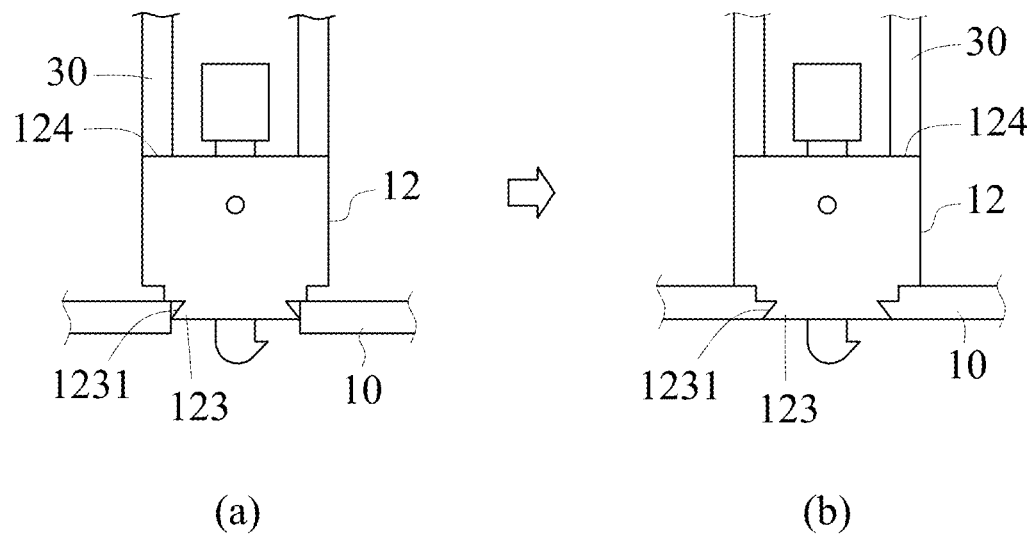
FIG. 20(a) and FIG. 20(b) are schematic views of the fastener structure according to the fourteenth embodiment of the present disclosure.

Referring to FIG. 20, in a preferred embodiment of the present disclosure, the fitting portion 123 has a storage space 1231, and the body portion 12 has a stamped surface 124. The stamped surface 124 of the body portion 12 is pressed under an applied force exerted by a die 30. Consequently, the material of the first object 10 enters or flows into the storage space 1231, such that the body portion 12 and the first object 10 are coupled together. Therefore, the body portion 12 has the fitting portion 123 whereby the body portion 12 is coupled to the first object 10 firmly.

Figure 21:
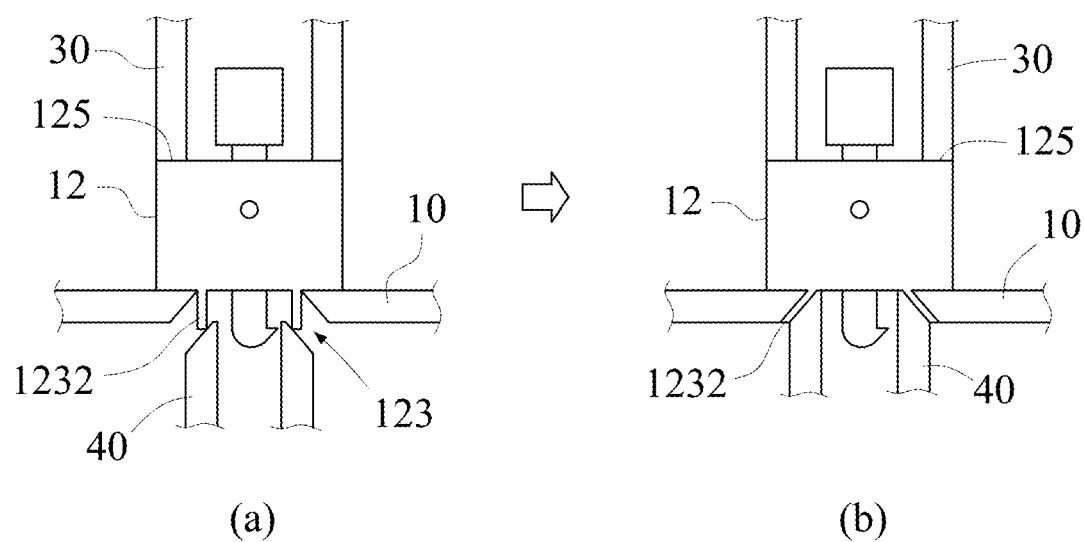
FIG. 21(a) and FIG. 21(b) are schematic views of the fastener structure according to the fifteenth embodiment of the present disclosure.

Referring to FIG. 21, in a preferred embodiment of the present disclosure, the fitting portion 123 has an engaging portion 1232, and the body portion 12 has an abutting surface 125. The die 30 abuts against the abutting surface 125. The engaging portion 1232 is pressed under an applied force exerted by another die 40, such that the engaging portion 1232 is deformed and engaged with the first object 10, thereby allowing the body portion 12 to be coupled to the first object 10. Therefore, owing to the fitting portion 123, the body portion 12 can be coupled to the first object 10 firmly.

Figure 22:
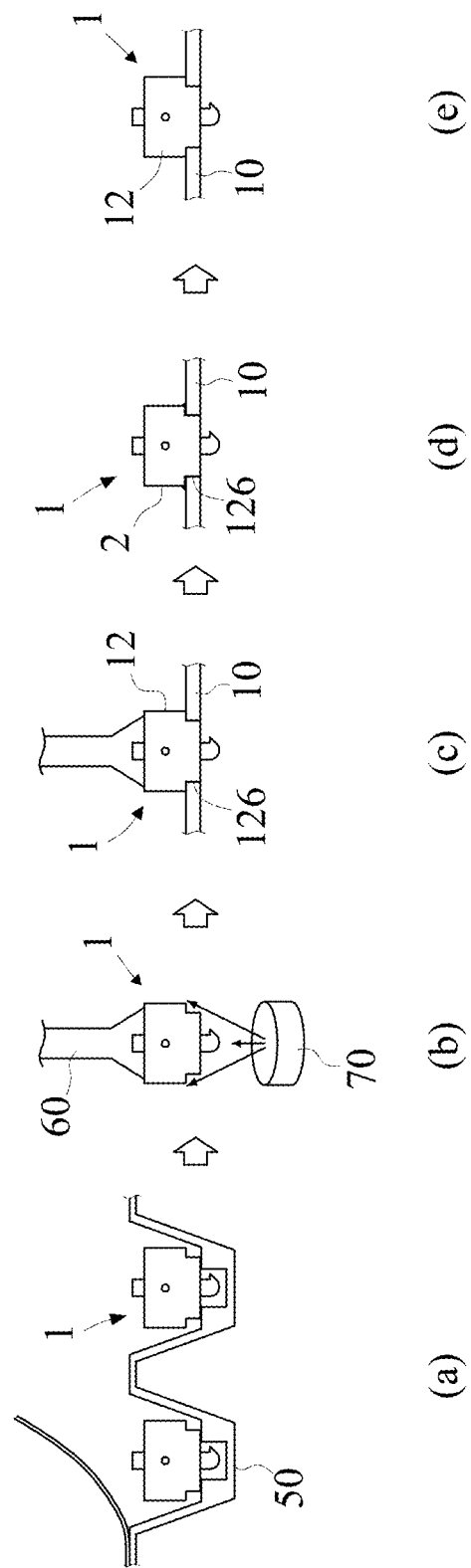
FIG. 22(a)-FIG. 22(e) are schematic views of the fastener structure according to the sixteenth embodiment of the present disclosure.

Referring to FIG. 22, in a preferred embodiment of the present disclosure, the fastener structure 1 is taken out of a carrier 50 with a tool 60 and then placed on the first object 10, thereby allowing the first and second objects 10, 20 to be coupled together.

In a preferred embodiment of the present disclosure, the body portion 12 has a weldable surface 126. The fastener structure 1 is taken out of the carrier 50 with the tool 60 and then placed on the first object 10, such that the body portion 12 is welded and coupled to the first object 10. Therefore, the fitting portion 123 of the body portion 12 enables the body portion 12 to be firmly coupled to the first object 10.

In a preferred embodiment of the present disclosure, the fastener structure 1 is taken out of the carrier 50 with the tool 60. Then, the positions of the fastener structure 1 and the first object 10 are calculated with a corresponding device 70, such that the tool 60 is precisely placed on the first object 10, thereby allowing the fastener structure 1 to be coupled to the first object 10. Therefore, the fastener structure 1 is precisely coupled to the first object 10.

In a preferred embodiment of the present disclosure, the tool 60 is a clamp, a vacuum suction device or a magnetic suction device. The corresponding device 70 is a visual comparison device, image comparison device or distance calculation device. Therefore, the fastener structure meets different usage needs.

Figure 23:
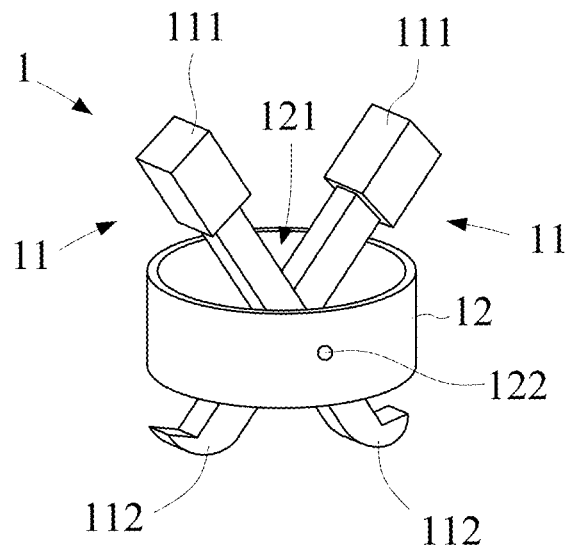
FIG. 23 is a perspective view of the fastener structure according to the seventeenth embodiment of the present disclosure.

Referring to FIG. 23, in a preferred embodiment of the present disclosure, the fastener structure 1 has two fastening elements 11 and a body portion 12.

Each fastening element 11 has the operation portion 111 and a fastening portion 112.

The body portion 12 has a mounting portion 121. Each fastening element 11 is penetratingly disposed at the mounting portion 121. The body portion 12 and each fastening element 11 are coupled together by the coupling portions 122. The body portion 12 is coupled to the first object. Each fastening portion 112 is fastened to a second object (not shown).

Figure 24:
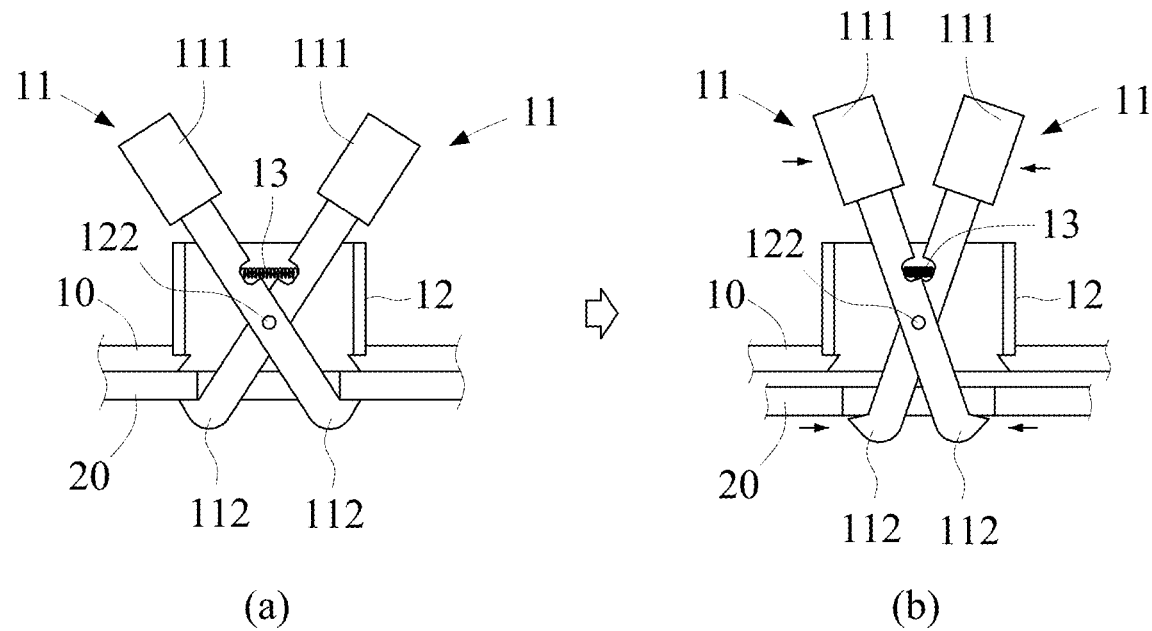
FIG. 24(a) and FIG. 24(b) are schematic views of the fastener structure according to the eighteenth embodiment of the present disclosure.

Referring to FIG. 24, in a preferred embodiment of the present disclosure, the fastener structure further comprises a resilient component 13 with two ends abutting against the fastening elements 11, respectively, such that each fastening element 11 undergoes resilient reciprocating motion.

To start using the fastener structure, the user manipulates in such a manner to allow the fitting portion 123 of the body portion 12 to be coupled to the first object 10 and pressed by the resilient component 13, such that the fastening portions 112 are fastened to the second object 20 from different directions. At this moment, the resilient component 13 is in a resilience release state, such that each fastening portion 112 is firmly fastened to the second object 20. When the user moves the operation portion 111 of each fastening element 11 inward, the resilient component 13 is in a resilient compressed state, such that the fastening portions 112 move simultaneously in the direction conducive to unfastening, thereby allowing each fastening portion 112 to be unfastened from the second object 20. After the fastening portions 112 have separated from the second object 20, the resilient component 13 returns to the resilience release state, such that each fastening element 11 undergoes resilient reciprocating motion within the mounting portion 121, thereby allowing the first object 10 and the second object 20 to be coupled together and separated repeatedly and rapidly.

Figure 25:
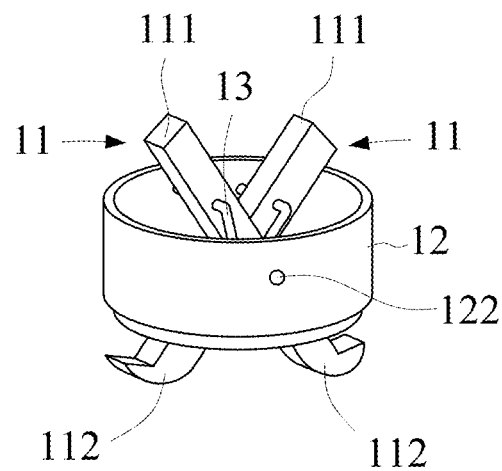
FIG. 25 is a perspective view of the fastener structure according to the nineteenth embodiment of the present disclosure.
Figure 26:
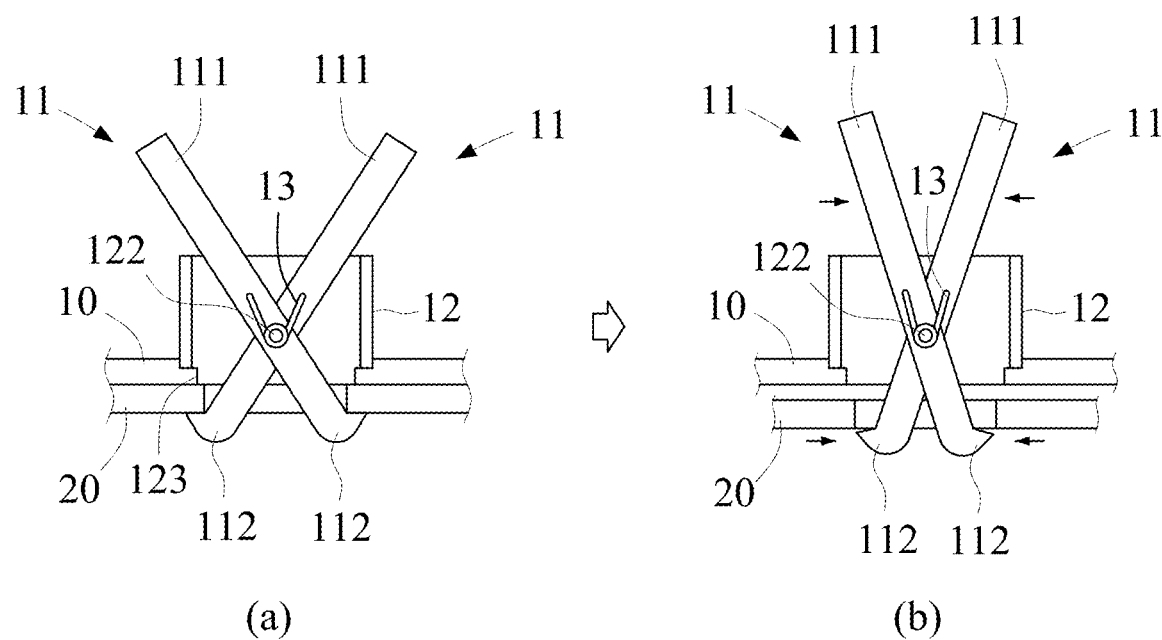
FIG. 26(a) and FIG. 26(b) are schematic views of the fastener structure according to the nineteenth embodiment of the present disclosure.

Referring to FIG. 25 and FIG. 26, in a preferred embodiment of the present disclosure, the resilient component 13 is a torsion spring with two ends abutting against the fastening elements 11, respectively. The fitting portion 123 of the body portion 12 is coupled to the first object 10 and pressed by the resilient component 13, such that the fastening portions 112 are fastened to the second object 20 in different directions, respectively. At this moment, the resilient component 13 is in the resilience release state, and thus each fastening portion 112 is firmly fastened to the second object 20. When the operation portions 111 of the fastening elements 11 are simultaneously moved inward, the resilient component 13 enters the resilient compressed state, such that the fastening portions 112 simultaneously move in the direction conducive to unfastening, thereby allowing the fastening portions 112 to be unfastened from the second object 20. After the fastening portions 112 have separated from the second object 20, the resilient component 13 returns to the resilience release state, such that each fastening element 11 undergoes resilient reciprocating motion within the mounting portion 121, thereby allowing the first object 10 and the second object 20 to be coupled together and separated repeatedly and rapidly.

Figure 27:
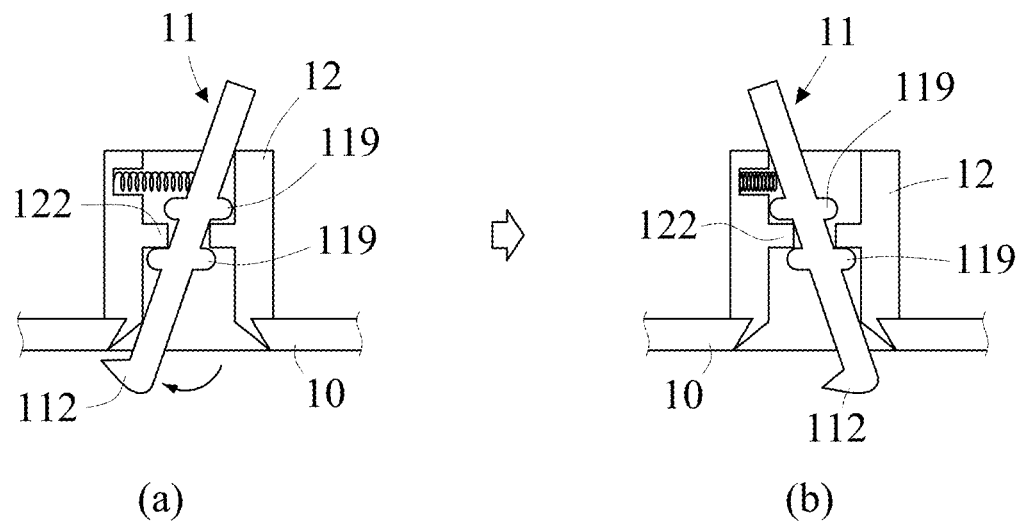
FIG. 27(a) and FIG. 27(b) are schematic views of the fastener structure according to the twentieth embodiment of the present disclosure.

Referring to FIG. 27, in a preferred embodiment of the present disclosure, the coupling portions 122 are disposed at an annular portion on the inner edge of the body portion 12. The fastening element 11 has two corresponding ring-shaped portions 119. The coupling portions 122 are movably disposed between the corresponding ring-shaped portions 119. Therefore, the fastening portion 112 of the fastening element 11 moves rotatably and is fastened to or unfastened from the second object (not shown), thereby allowing the first object 10 and the second object to be coupled together and separated repeatedly and rapidly.

Figure 28:
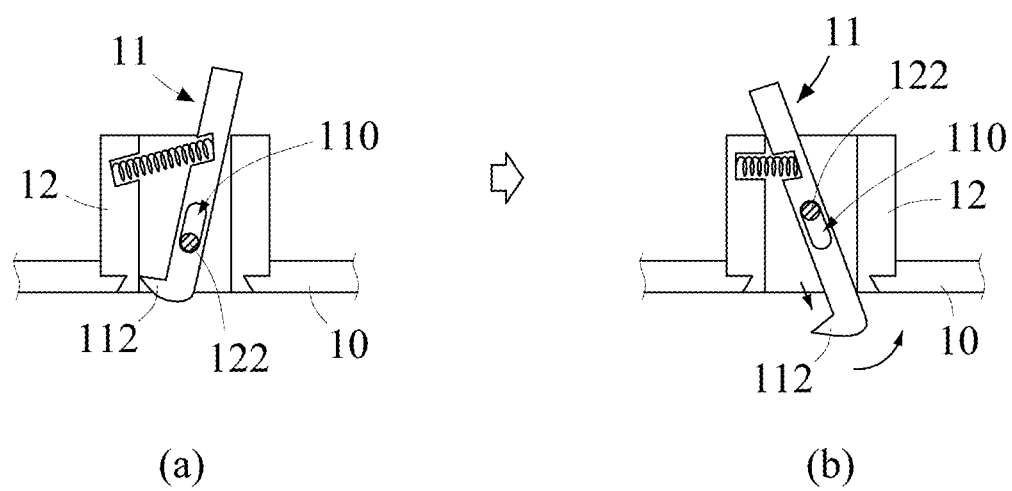
FIG. 28(a) and FIG. 28(b) are schematic views of the fastener structure according to the twenty-first embodiment of the present disclosure.

Referring to FIG. 28, in a preferred embodiment of the present disclosure, the fastening element 11 has a movable portion 110. Operating in conjunction with the coupling portions 122, the movable portion 110 is movably coupled to the body portion 12. Therefore, the fastening portion 112 of the fastening element 11 moves vertically and then moves rotatably in order to be fastened to or unfastened from the second object (not shown), thereby allowing the first object 10 and the second object to be coupled together and separated repeatedly and rapidly.

Figure 29:
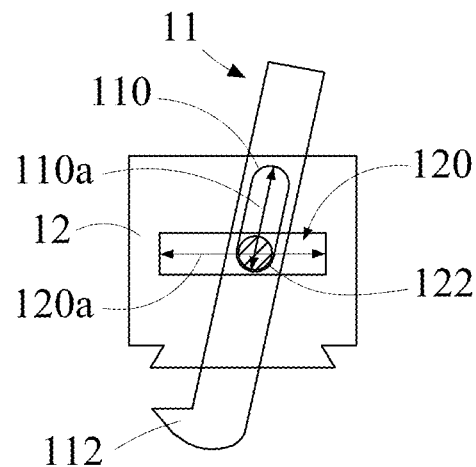
FIG. 29 is a schematic view of the fastener structure according to the twenty-second embodiment of the present disclosure.
Figure 30:
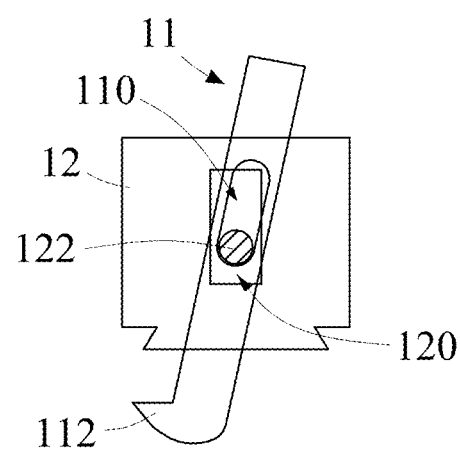
FIG. 30 is a schematic view of the fastener structure according to the twenty-third embodiment of the present disclosure.
Figure 31:
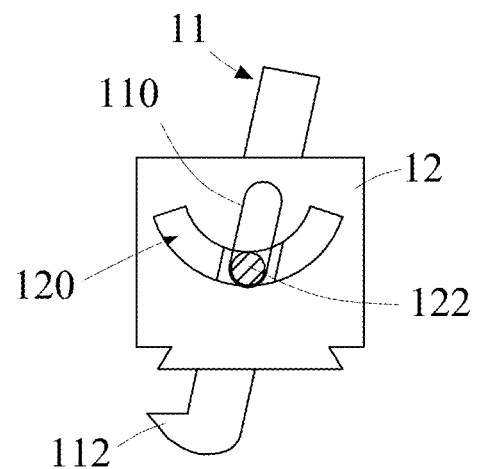
FIG. 31 is a schematic view of the fastener structure according to the twenty-fourth embodiment of the present disclosure.
Figure 32:
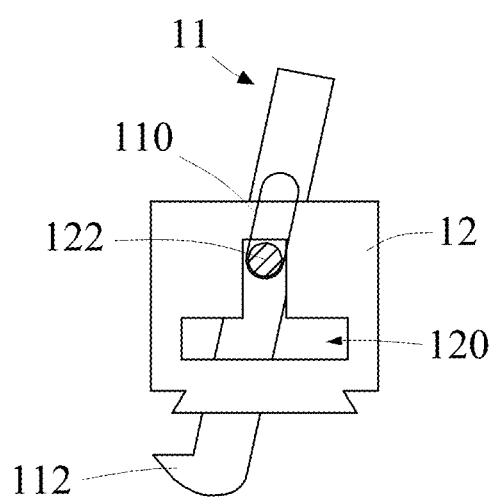
FIG. 32 is a schematic view of the fastener structure according to the twenty-fifth embodiment of the present disclosure.
Figure 33:
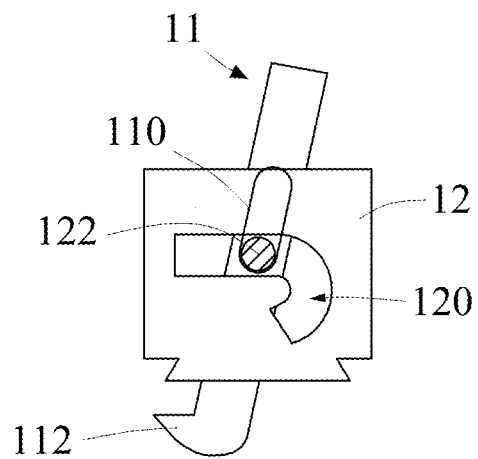
FIG. 33 is a schematic view of the fastener structure according to the twenty-sixth embodiment of the present disclosure.
Figure 34:
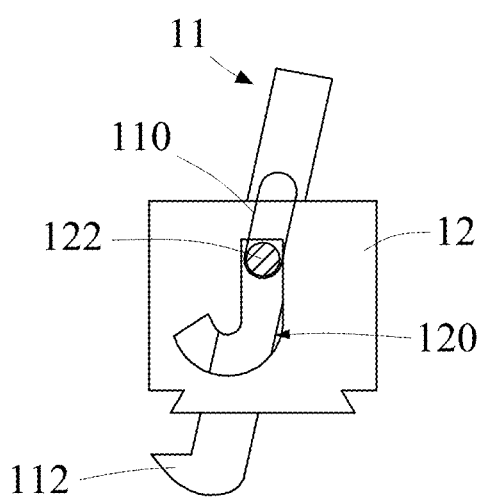
FIG. 34 is a schematic view of the fastener structure according to the twenty-seventh embodiment of the present disclosure.

Referring to FIG. 29 through FIG. 34, in a preferred embodiment of the present disclosure, the fastening element 11 and the body portion 12 have the movable portions 110, 120, respectively. As shown in FIG. 29, the movable portion 110 is an elongated hole with a stroke 110a and the movable portion 120 is also an elongated hole with a stroke 120a. Operating in conjunction with the coupling portions 122, the movable portion 110 is movably coupled to the movable portion 120 of the body portion 12. The movable portion 120 of the body portion 12 is transverse (shown in FIG. 29), vertical (shown in FIG. 30), rotatable (shown in FIG. 31), vertical and extending transversely (shown in FIG. 32), transverse and extending rotatably (shown in FIG. 33) or vertical and extending rotatably (shown in FIG. 34). Therefore, the fastening portion 112 of the fastening element 11 moves laterally, vertically, rotatably, vertically and then laterally, laterally and then rotatably, or vertically and then rotatably so as to be fastened to the second object or moves reversely so as to be unfastened from the second object, thereby allowing the first object and the second object (not shown) to be coupled together and separated repeatedly and rapidly. A floating displacement (gap) is defined between the body portion 12 and the fastening element 11, between the body portion 12 and the coupling portion 122, or between the fastening element 11 and the coupling portion 122. The floating displacement is lateral or vertical. The floating displacement ranges from 0.001 mm to 50 mm.

Figure 35:
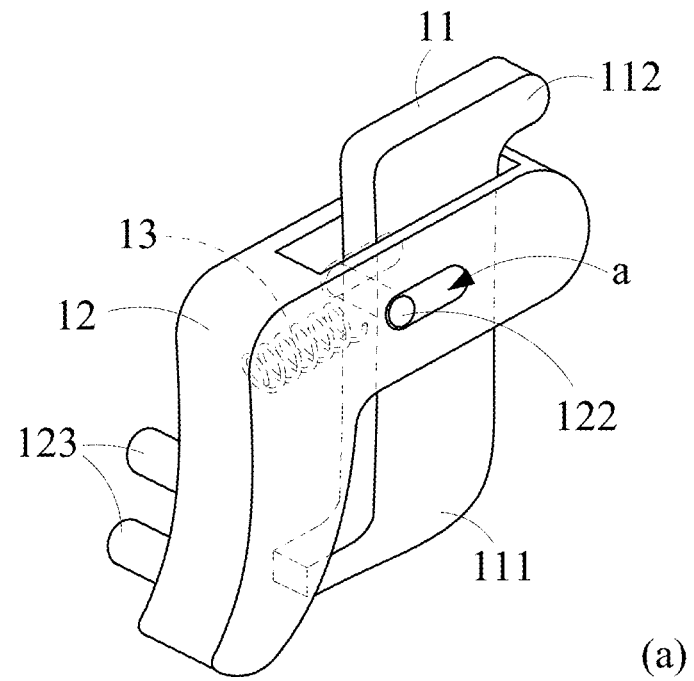
FIG. 35(a) and FIG. 35(b) are schematic views of the fastener structure according to the twenty-eighth embodiment of the present disclosure.
Figure 35:
Figure 35:
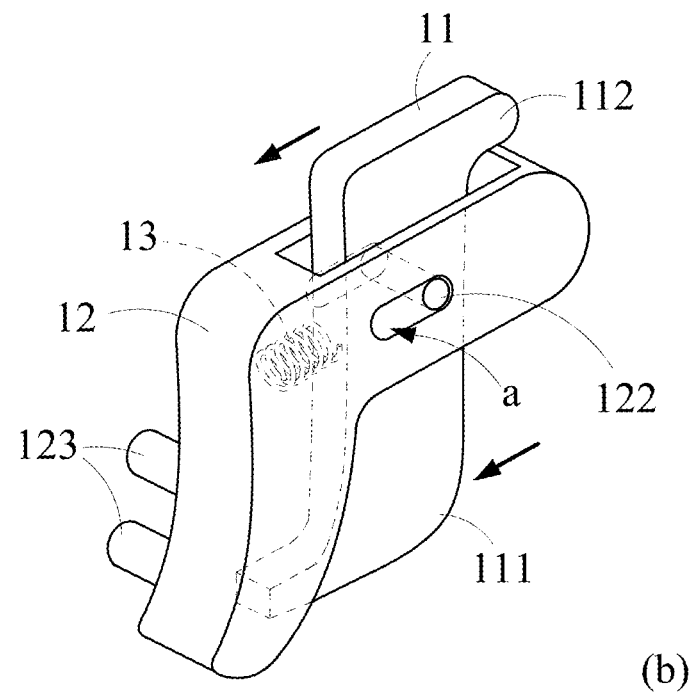
Figure 36:
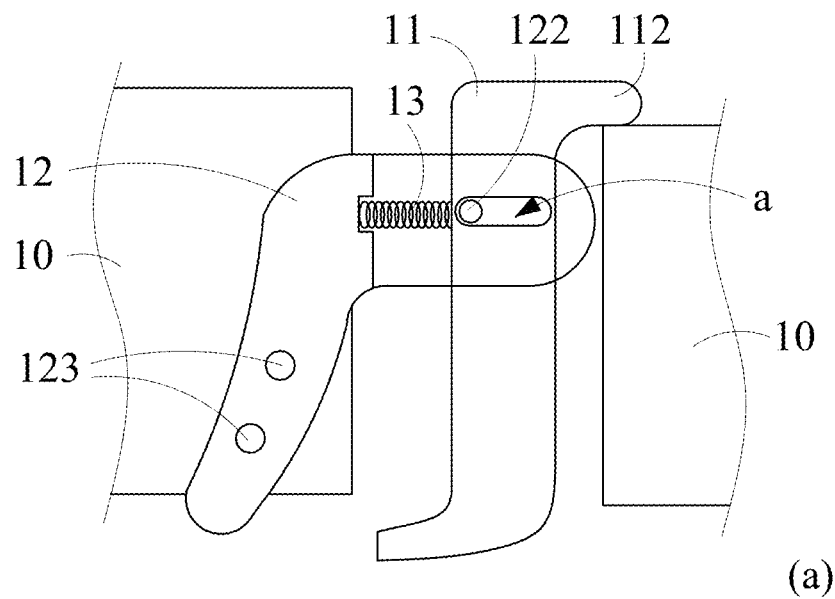
FIG. 36(a) and FIG. 36(b) are another schematic views of the fastener structure according to the twenty-eighth embodiment of the present disclosure.
Figure 36:
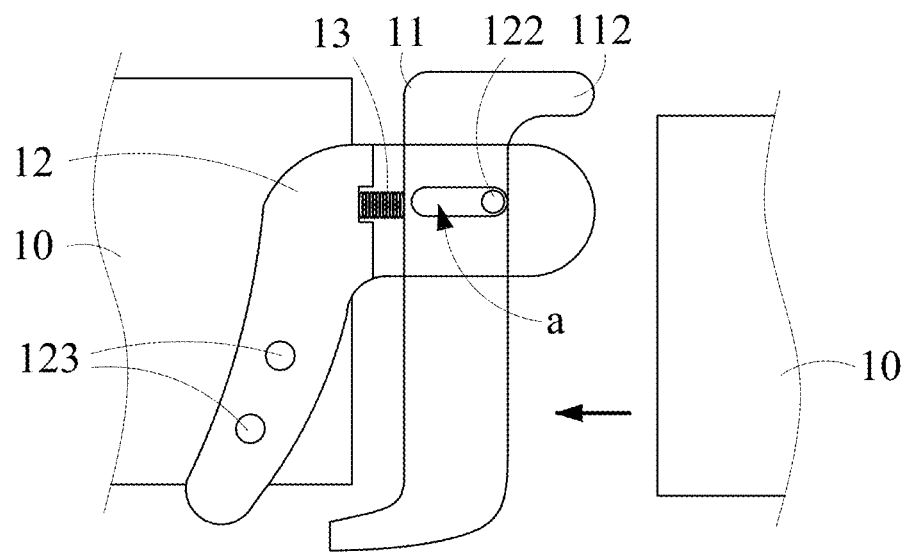

Referring to FIG. 35 and FIG. 36, in a preferred embodiment of the present disclosure, the body portion 12 has two fitting portions 123. The fitting portions 123 are fitted to the first object 10. The resilient component 13 has one end abutting against the fastening element 11 and the other end abutting against the body portion 12. The fastening element 11 is coupled to the coupling portion 122 of the body portion 12. A floating space a is defined between the coupling portion 122 and the fastening element 11, such that the fastening element 11 moves within the floating space a.

To start using the fastener structure, the user manipulates the operation portions 111 of the fastening elements 11 in opposite directions, such that each fastening element 11 moves within the floating space a, thereby allowing the fastening portion 112 to be fastened to the second object 20. To remove the second object 20, the user manipulates the operation portions 111 of the fastening elements 11 in the same direction, such that each fastening element 11 moves within the floating space a; consequently, the fastening portion 112 is removed from the second object 20, thereby allowing the first object 10 and the second object 20 to be coupled together and separated repeatedly and rapidly.

Figure 37:
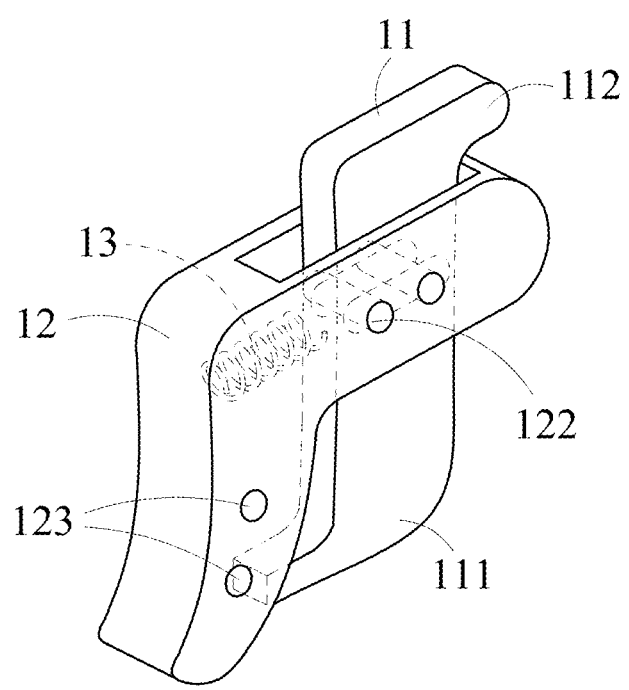
FIG. 37 is a perspective view of the fastener structure according to the twenty-ninth embodiment of the present disclosure.
Figure 38:
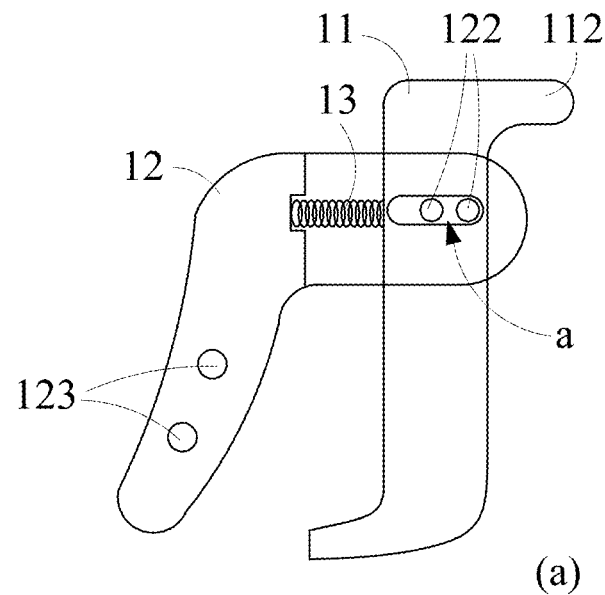
FIG. 38(a) and FIG. 38(b) are schematic views of the fastener structure according to the twenty-ninth embodiment of the present disclosure.
Figure 38:
Figure 38:
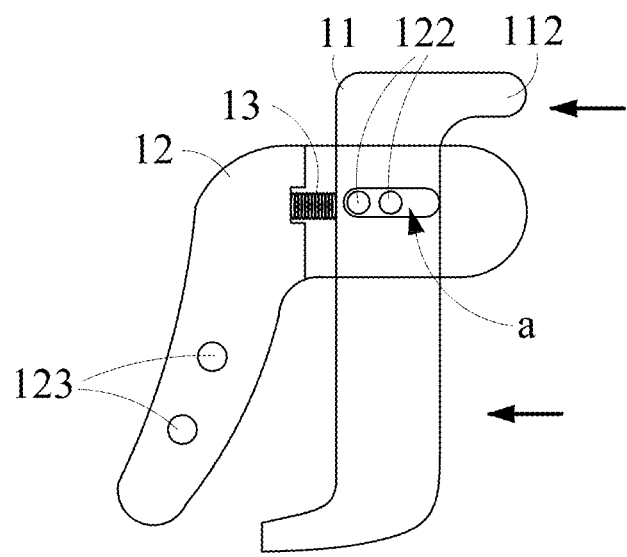

Referring to FIG. 37 and FIG. 38, in a preferred embodiment of the present disclosure, the body portion 12 and the fastening element 11 are coupled together by at least one coupling portion 122, such that the floating space a is defined between the fastening element 11 and each coupling portion 122, thereby allowing the fastening element 11 to move within the floating space a.

To start using the fastener structure, the user manipulates the operation portions 111 of the fastening elements 11 in opposite directions, such that each fastening element 11 moves within the floating space a, thereby allowing the fastening portion 112 to be fastened to the second object. To remove the second object, the user manipulates the operation portions 111 of the fastening elements 11 in the same direction to allow each fastening element 11 to move within the floating space a, such that the fastening portion 112 removes the second object, thereby allowing the first object and the second object to be coupled together and separated repeatedly and rapidly.

Figure 39:
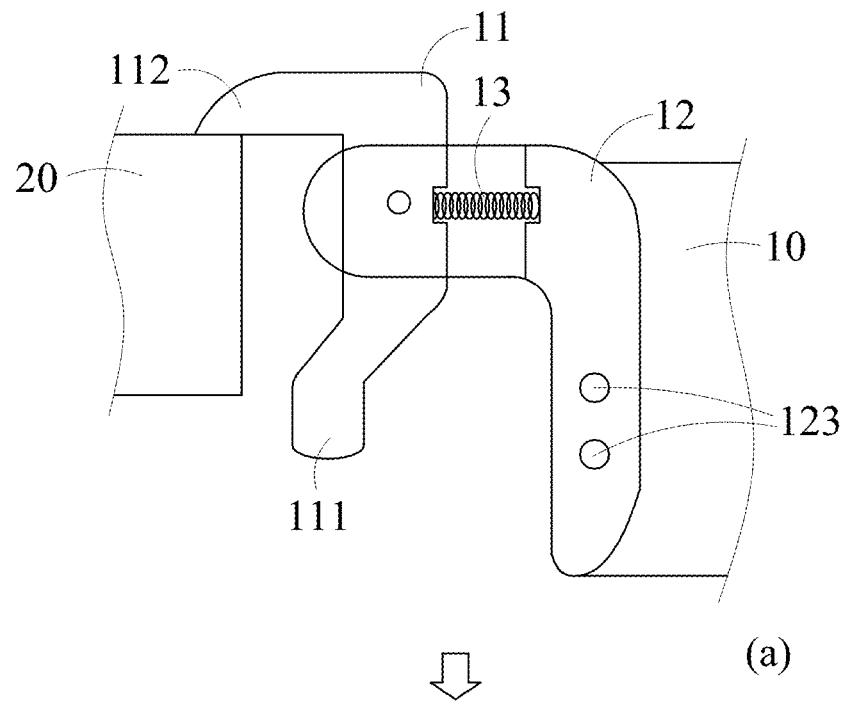
FIG. 39(a) and FIG. 39(b) are schematic views of the fastener structure according to the thirtieth embodiment of the present disclosure.
Figure 39:
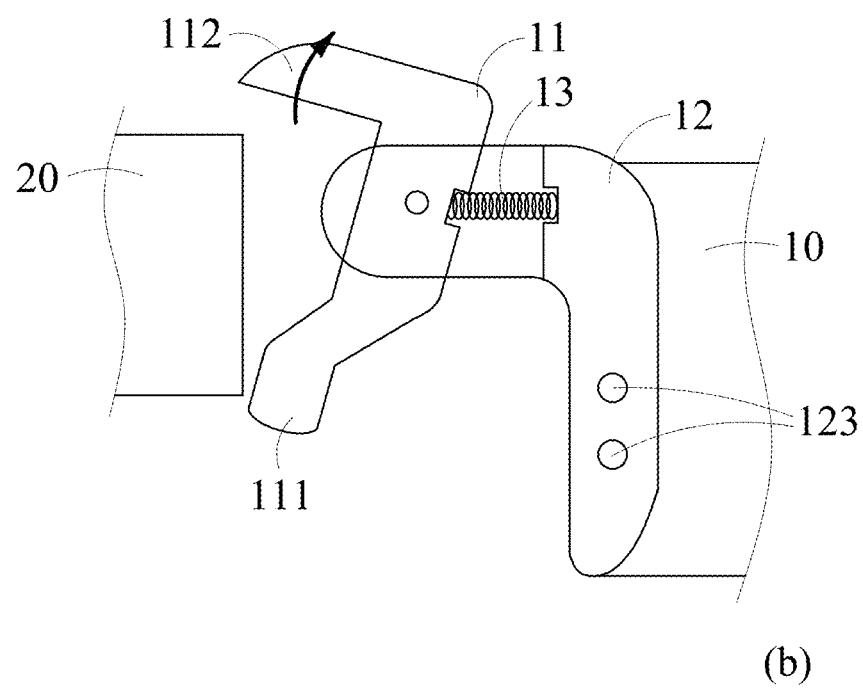

Referring to FIG. 39, in a preferred embodiment of the present disclosure, the body portion 12 has two fitting portions 123. The fitting portions 123 are fitted to the first object 10. The resilient component 13 has one end abutting against the fastening element 11 and another end abutting against the body portion 12. The fastening element 11 is coupled to the coupling portion 122 of the body portion 12. To start using the fastener structure, the user manipulates the operation portions 111 of the fastening elements 11 in opposite directions to allow the fastening elements 11 to move relative to the body portion 12, such that the fastening portion 112 is fastened to the second object 20. To remove the second object 20, the user manipulates the operation portions 111 of the fastening elements 11 in the same direction to allow the fastening elements 11 to move relative to the body portion 12, such that the fastening portion 112 removes the second object 20, thereby allowing the first object 10 and the second object 20 to be coupled together and separated repeatedly and rapidly.

Figure 40:
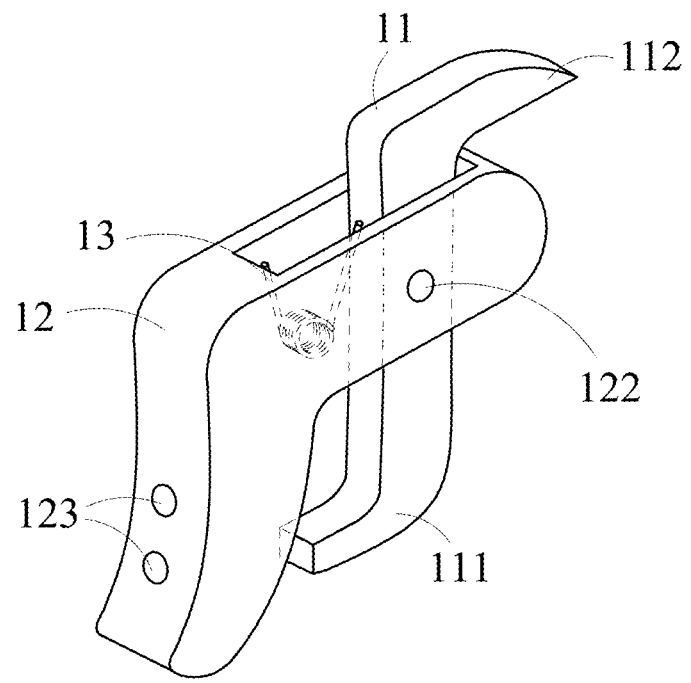
FIG. 40 is a perspective view of the fastener structure according to the thirty-first embodiment of the present disclosure.
Figure 41:
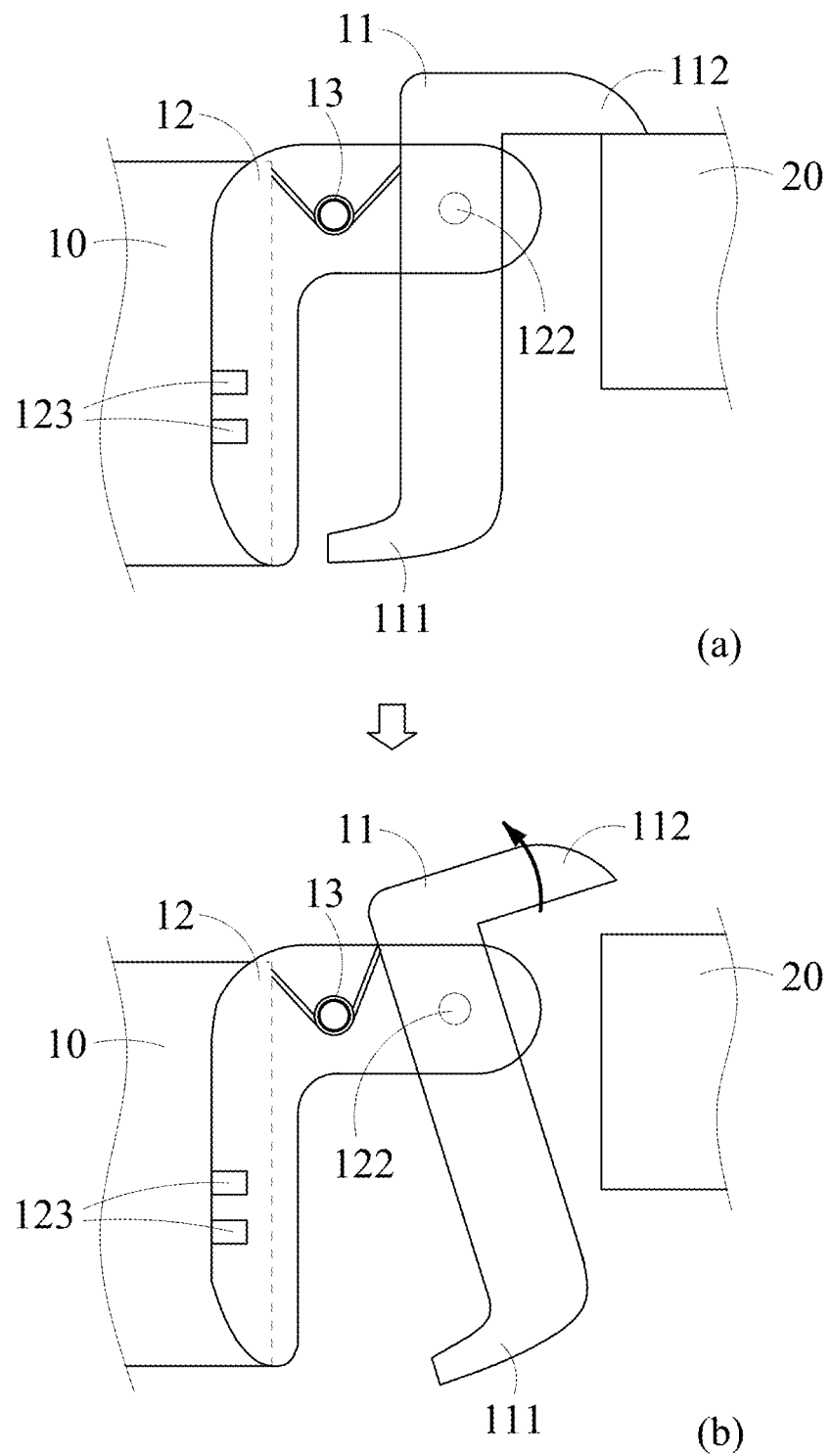
FIG. 41(a) and FIG. 41(b) are schematic views of the fastener structure according to the thirty-first embodiment of the present disclosure.

Referring to FIG. 40 and FIG. 41, in a preferred embodiment of the present disclosure, the resilient component 13 is pivotally connected to the body portion 12. The resilient component 13 has one end abutting against the fastening element 11 and the other end abutting against the body portion 12, such that the fastening element 11 undergoes resilient reciprocating motion. To start using the fastener structure, the user manipulates the operation portions 111 of the fastening elements 11 in opposite directions to allow the fastening elements 11 to move relative to the body portion 12, such that the fastening portion 112 is fastened to the second object 20. To remove the second object 20, the user manipulates the operation portions 111 of the fastening elements 11 in the same direction to allow the fastening elements 11 to move relative to the body portion 12, such that the fastening portion 112 removes the second object 20, thereby allowing the first object 10 and the second object 20 to be coupled together and separated repeatedly and rapidly.

Figure 42:
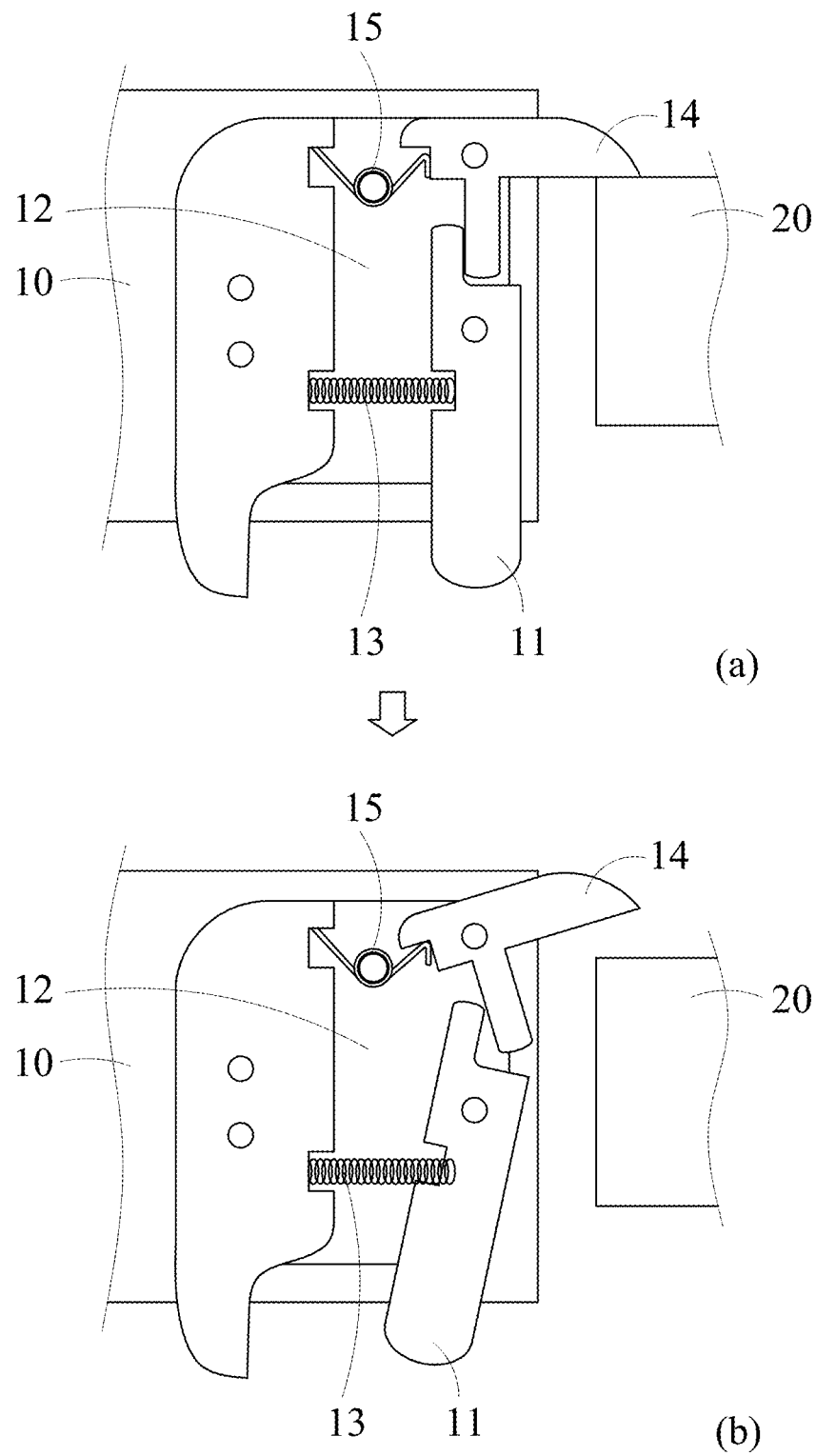
FIG. 42(a) and FIG. 42(b) are schematic views of the fastener structure according to the thirty-second embodiment of the present disclosure.

Referring to FIG. 42, in a preferred embodiment of the present disclosure, the fastener structure further provides another fastening element 14. The fastening element 11 abuts against the another fastening element 14, such that the another fastening element 14 is fastened to another resilient component 15. The another resilient component 15 has one end abutting against the another fastening element 14 and another end abutting against the body portion 12. To start using the fastener structure, the user manipulates in such a manner to allow the fastening element 11 to abut against the another fastening element 14, such that the another fastening element 14 is fastened to or unfastened from the second object 20. The resilient component 13 and the another resilient component 15 together effect resilience release or compression, such that the fastening element 11 abuts against the another fastening element 14. To remove the second object 20, the user compresses the resilient component 13 and the another resilient component 15, and thus the another resilient component 15 effectuates resilience release in a fastened state or upon removal of the second object 20, thereby allowing the first object 10 and the second object 20 to be coupled together and separated repeatedly and rapidly.

In conclusion, in the embodiments of the present disclosure, a fastener structure comprises a body portion disposed on a first object and fastened to or unfastened from a second object by a fastening element, thereby allowing two objects to be coupled together and separated repeatedly and rapidly.

While the present disclosure has been described by means of specific embodiments, numerous modifications and variations could be made thereto by those skilled in the art without departing from the scope and spirit of the present disclosure set forth in the claims.

What is claimed is:

1. A fastener structure, comprising:
a fastening element having an operation portion at one end and a fastening portion at another end; and
a body portion having a mounting portion and coupled to the fastening element by a coupling portion, wherein the fastening element is penetratingly disposed at the mounting portion;
wherein the fastening element or body portion has a holding portion, and the holding portion holds a resilient component, wherein the resilient component has an end abutting against the fastening element and another end abutting against the body portion, such that the fastening element undergoes resilient reciprocating motion;
wherein the operation portion and the fastening portion are protruded outwards from the body portion;
wherein the mounting portion being a plane portion, recess portion, through hole or through recess, and the fastening element is movably coupled to the mounting portion by the coupling portion.

2. The fastener structure of claim 1, wherein the body portion coupled to a first object, wherein the fastening element is fastened to a second object.

3. The fastener structure of claim 1, wherein a floating space is defined between the coupling portion and the fastening element or the body portion, such that the fastening element or the body portion moves within the floating space.

4. The fastener structure of claim 1, further comprising another fastening element and another resilient component, wherein the fastening element abuts against the another fastening element, such that the another fastening element is fastened thereto, wherein the another resilient component has an end abutting against the another fastening element and another end abutting against the body portion, with the body portion fastened to the another resilient component, the another resilient component having an end abutting against the another fastening element and another end abutting against the body portion.

5. A fastener structure, comprising:
two fastening elements, each fastening element having an operation portion at one end and a fastening portion at another end; and
a body portion having a mounting portion and coupled to the fastening elements by one or more coupling portions, wherein the two fastening elements are penetratingly disposed at the mounting portion;
wherein each of the fastening elements or body portion has a holding portion, and the holding portion holds a resilient component;
wherein each said operation portion and each said fastening portion are protruded outwards from the body portion;
wherein the mounting portion being a plane portion, recess portion, through hole or through recess, and the two fastening elements are movably coupled to the mounting portion by the coupling portion;
wherein each said operation portion has two guiding surfaces, and each said fastening portion has a corresponding guiding surface, such that the guiding surfaces of the operation portions push the corresponding guiding surfaces of the fastening portions, respectively, thereby allowing the fastening portions to move.

6. The fastener structure of claim 5, wherein the body portion being adapted to be coupled to a first object, and each said fastening element being fastened to a second object.

7. The fastener structure of claim 5, wherein the resilient component with two ends abutting against the fastening elements, respectively, to allow the fastening elements to undergo resilient reciprocating motion.

8. The fastener structure of claim 5, wherein a floating space is defined between the one or more coupling portions and each said fastening element or the body portion, such that each said fastening element or the body portion moves within the floating space.

9. A fastener structure, comprising:
 a fastening element having an operation portion at one end and a fastening portion at another end; and
 a body portion having a mounting portion and coupled to the fastening element by a coupling portion, wherein the fastening element is penetratingly disposed at the mounting portion;
 wherein the fastening element or body portion has a holding portion, and the holding portion holds a resilient component;
 wherein the operation portion and the fastening portion are protruded outwards from the body portion;
 wherein the mounting portion being a plane portion, recess portion, through hole or through recess, and the fastening element is movably coupled to the mounting portion by the coupling portion;
 wherein the operation portion has a guiding surface, and the fastening portion has a corresponding guiding surface, such that the guiding surface of the operation portion pushes the corresponding guiding surface of the fastening portion, thereby allowing the fastening portion to move.

10. A fastener structure, comprising:
 a fastening element having an operation portion at one end and a fastening portion at another end; and
 a body portion having a mounting portion and coupled to the fastening element by a coupling portion, wherein the fastening element is penetratingly disposed at the mounting portion;
 wherein the fastening element or body portion has a holding portion, and the holding portion holds a resilient component;
 wherein the operation portion and the fastening portion are protruded outwards from the body portion;
 wherein the fastening portion of the fastening element is coupled to the body portion by the coupling portion, and the operation portion of the fastening element is coupled to the body portion by another coupling portion.

11. A fastener structure, comprising:
 a fastening element having an operation portion and a fastening portion; and
 a body portion having a mounting portion and coupled to the fastening element by a coupling portion, wherein the fastening element is penetratingly disposed at the mounting portion;
 wherein the body portion is coupled to a first object, the fastening portion is fastened to a second object, the second object has a corresponding fastening portion which the fastening portion is fastened to, the corresponding fastening portion has a wide hole portion and a fastened portion, the wide hole portion is larger than the fastening portion, the fastened portion is smaller than the fastening portion, and the fastening portion penetrates the wide hole portion before being fastened to the fastened portion.

12. The fastener structure of claim 11, further comprising a resilient component with an end abutting against the fastening element and another end abutting against the body portion, such that the fastening element undergoes resilient reciprocating motion.

13. The fastener structure of claim 12, further comprising another fastening element and another resilient component, wherein the another resilient component has an end abutting against the another fastening element and another end abutting against the body portion, the body portion is fastened to another resilient component, the another resilient component has an end abutting against the another fastening element and another end abutting against the body portion.

14. The fastener structure of claim 11, wherein the body portion has a fitting portion, and the fitting portion is fitted to the first object.

15. The fastener structure of claim 11, further comprising a resilient component with an end abutting against the fastening element and another end abutting against the body portion, such that the fastening element undergoes resilient reciprocating motion.

16. The fastener structure of claim 11, wherein the coupling portion is jointed to or fitted around a resilient component, and the resilient component is a torsion spring with an end abutting against the fastening element and another end abutting against the body portion.

17. The fastener structure of claim 11, wherein the fastening portion has a guiding portion for guiding a corresponding fastening portion of the second object in engaging with the fastening portion.

18. The fastener structure of claim 11, wherein the mounting portion has a laterally closed structure with a vertically open space, such that the fastening element moves within the vertically open space of the laterally closed structure.

19. The fastener structure of claim 11, wherein the fastening element has a rod portion of a smaller width than the fastening portion to allow the fastening portion to penetrate the second object, and then the rod portion of smaller width than the fastened portion is fastened to the fastened portion of the second object, such that the fastening portion holds the second object.

* * * * *